(12) United States Patent
Cho

(10) Patent No.: US 9,372,291 B2
(45) Date of Patent: Jun. 21, 2016

(54) HEAT BLOCKING SYSTEM UTILIZING PARTICULATES

(71) Applicant: Sung Nae Cho, Kent, WA (US)

(72) Inventor: Sung Nae Cho, Kent, WA (US)

(*) Notice: Subject to any disclaimer, the term of this patent is extended or adjusted under 35 U.S.C. 154(b) by 65 days.

(21) Appl. No.: 14/146,426

(22) Filed: Jan. 2, 2014

(65) Prior Publication Data

US 2014/0118815 A1 May 1, 2014

Related U.S. Application Data

(60) Provisional application No. 61/899,832, filed on Nov. 4, 2013, provisional application No. 61/908,608, filed on Nov. 25, 2013.

(51) Int. Cl.
| | |
|---|---|
| *G02F 1/23* | (2006.01) |
| *G02B 5/20* | (2006.01) |
| *G02B 5/26* | (2006.01) |
| *G02F 1/01* | (2006.01) |

(52) U.S. Cl.
CPC ............... *G02B 5/208* (2013.01); *G02B 5/206* (2013.01); *G02B 5/26* (2013.01); *G02F 1/0102* (2013.01); *G02F 2201/083* (2013.01); *G02F 2201/30* (2013.01); *Y10T 428/24967* (2015.01); *Y10T 428/249921* (2015.04); *Y10T 428/249971* (2015.04); *Y10T 428/249975* (2015.04); *Y10T 428/25* (2015.01)

(58) Field of Classification Search
CPC .... B82Y 20/00; H04B 10/505; H04B 10/506; H04B 10/50575
USPC ......... 359/278, 290–298, 350, 358–359, 361; 428/212, 328–329, 429; 165/279–280; 219/200, 202–203, 209–210, 219–220; 252/582–584, 587–589

See application file for complete search history.

(56) References Cited

U.S. PATENT DOCUMENTS

| | | | |
|---|---|---|---|
| 4,623,390 A | 11/1986 | Delmonico | |
| 7,060,350 B2 * | 6/2006 | Takaya et al. | ............... 428/323 |
| 7,760,424 B2 | 7/2010 | Takeuchi | |
| 8,009,351 B2 | 8/2011 | Ando | |
| 8,287,998 B2 | 10/2012 | Skelhorn | |

(Continued)

*Primary Examiner* — Bumsuk Won
*Assistant Examiner* — Tamara Y Washington
(74) *Attorney, Agent, or Firm* — KORUS Patent, LLC; Seong Il Jeong

(57) ABSTRACT

A multi-layered coating system for reflecting infrared waves is provided. The multi-layered coating system includes a layer one positioned above a substrate, wherein the layer one includes a plurality of well separated spherical particulates of radius $a_1$ and a plurality of well separated spherical voids of radius $b_1 > a_1$ that are randomly distributed, and a filler material of refractive index $n_1$ intervening in the spaces between said spherical particulates and spherical voids; and subsequent layers expressible as the following word-equation, "a layer i positioned above the layer i−1, wherein the layer i includes a plurality of well separated spherical particulates of radius $a_i$ and a plurality of well separated spherical voids of radius $b_i > a_i$ (where $b_i > b_{i-1}$) that are randomly distributed, and a filler material of refractive index $n_i$ intervening in the spaces between said spherical particulates and spherical voids," where integer i is greater than one.

20 Claims, 11 Drawing Sheets

(56) References Cited

U.S. PATENT DOCUMENTS

| | | |
|---|---|---|
| 8,362,684 B2 | 1/2013 | Bawendi |
| 8,395,042 B2 | 3/2013 | Dasgupta |
| 2007/0036985 A1 | 2/2007 | Kamitani |
| 2007/0298242 A1 | 12/2007 | Huo |
| 2008/0035021 A1 | 2/2008 | Sambasivan |
| 2010/0027125 A1* | 2/2010 | Sakaguchi et al. ............ 359/599 |
| 2010/0203336 A1 | 8/2010 | Shiao |
| 2012/0293797 A1* | 11/2012 | Braeckmans et al. ........ 356/246 |
| 2013/0003163 A1 | 1/2013 | Nowatzyk |
| 2013/0108873 A1 | 5/2013 | Shiao |
| 2013/0161578 A1 | 6/2013 | Shiao |
| 2013/0207073 A1 | 8/2013 | Bawendi |
| 2013/0266800 A1 | 10/2013 | Buonsanti |

* cited by examiner

HEAT BLOCKING SYSTEM UTILIZING PARTICULATES

CROSS-REFERENCE TO RELATED APPLICATIONS

This application claims the benefit of U.S. Provisional Patent Application No. 61/899,832, filed on Nov. 4, 2013; and U.S. Provisional Patent Application No. 61/908,608, filed on Nov. 25, 2013, the disclosures of which are incorporated herein by reference in their entirety as if recited in full.

FIELD OF THE INVENTION

The present disclosure relates to a multi-layered coating system that selectively reflects electromagnetic waves in a particular range of wavelengths while transmitting the remainder. More particularly, this disclosure relates to a multi-layered coating system (or a multi-layered film structure) for reflecting infrared electromagnetic waves, wherein each layer in the multi-layered coating system includes a plurality of well separated spherical particulates and a plurality of well separated spherical voids that are randomly distributed, and a filler material intervening in the spaces between said spherical particulates and spherical voids.

BACKGROUND OF THE INVENTION

A great portion of man made energies are used up in heating and cooling. For example, a large portion of utility bills in summer are often associated with energies used up in running air-conditioners to keep the indoor temperatures low whereas, during the winter, energies are used up in running heaters to maintain indoor warm. Most of the wasted energies in heating and cooling can be attributed to a poor insulation against heat loss. In most prior arts on heat resistant paints, an ordinary paint is turned into a heat resisting paint by blending with it particulates and voids. In other similar prior arts, colloidal particulates are blended in film-forming filler materials, wherein such materials are applied over substrates like windowpanes and glasses to block infrared electromagnetic waves.

One class of prior arts on heat blocking technologies involve heat resistant paints. In U.S. Pat. No. 4,623,390, glass microspheres or hollow glass extenders are blended in an ordinary paint to reduce a direct thermal conductivity, which greatly improves insulation against heat loss. In one embodiment, glass microspheres of diameters ranging from approximately 50 microns to 150 microns are blended in an ordinary paint whereas, in an another embodiment, glass microspheres of approximately 100 microns in diameters are blended in an ordinary paint. Otherwise, U.S. Pat. No. 4,623,390 does not discuss on any aspects of the multi-layered coating structures discussed in the present invention.

In U.S. Pat. No. 8,287,998 B2, hollow microspheres selected from glass, ceramic, and organic polymer microspheres of mean particle sizes between 0.5 microns and 150 microns are blended in an ordinary paint to reduce the direct thermal conductivity. Furthermore, U.S. Pat. No. 8,287,998 B2 also incorporates infrared reflective pigment materials in an ordinary paint mixture to reduce thermal conductivity associated with radiative heat transfers. Otherwise, U.S. Pat. No. 8,287,998 B2 does not discuss on any aspects of the multi-layered coating structures discussed in the current invention.

In U.S. Pat. No. 2010/0,203,336 A1, a solar reflective roofing granule is disclosed. In one embodiment, a solar reflective granule is formed by sintering ceramic particles, wherein the sintered ceramic particles are coated with solar reflective particles. Otherwise, U.S. Pat. No. 2010/0,203,336 A1 does not discuss on any aspects of the multi-layered coating structures covered in the present disclosure.

In U.S. Pat. No. 2013/0,108,873 A1, a roofing granule forming particle is coated with a nanoparticle layer which reflects near infrared radiation. Similarly, in U.S. Pat. No. 2013/0,161,578 A1, a roofing granule is formed from an infrared reflecting inert mineral core particle which has naturally occurring voids (or defects). Otherwise, neither U.S. Pat. No. 2013/0,108,873 A1 nor U.S. Pat. No. 2013/0,161,578 A1 discuss on any aspects of the multi-layered coating structures portrayed in the current disclosure.

In U.S. Pat. No. 2008/0,035,021 A1, a method for fabricating aluminum phosphate hollow microspheres is disclosed. It also illustrates how such particulates can be utilized to improve insulation against heat loss. Otherwise, U.S. Pat. No. 2008/0,035,021 A1 does not discuss on any aspects of the multi-layered coating structures covered by the present invention.

In U.S. Pat. No. 2007/0,298,242 A1 a lens for filtering optical waves is disclosed, wherein the metallic nano-particulates comprising thin-film layers are formed on the lens surface. Otherwise, U.S. Pat. No. 2007/0,298,242 A1 does not discuss on any aspects of the multi-layered coating structures discussed in the present disclosure.

In U.S. Pat. No. 2007/0,036,985 A1, indium tin oxide (ITO) fine particulates are blended with a film-forming mixture to form a thin-film layer which reflects infrared waves. Otherwise, U.S. Pat. No. 2007/0,036,985 A1 does not discuss on any aspects of the multi-layered coating structures illustrated in the present invention.

In U.S. Pat. No. 2013/0,266,800 A1, a method for preparing aluminum-doped zinc oxide (AZO) nanocrystals is disclosed. It further discloses a thin-film structure for reflecting infrared waves which utilizes the AZO nano-particulates. Otherwise, U.S. Pat. No. 2013/0,266,800 A1 does not discuss on any aspects of the multi-layered coating structures discussed in the present disclosure.

The present invention is particularly similar to U.S. Pat. Nos. 7,760,424 B2 and 8,009,351 B2, wherein multi-layered thin-film structures utilizing colloidal particulates to reflect infrared electromagnetic waves are disclosed. There are, however, fundamental differences between this invention and the foregoing prior arts which are noticeable. They are summarized below.

Following are the specifications of U.S. Pat. Nos. 7,760,424 B2 and 8,009,351 B2:

1. In U.S. Pat. Nos. 7,760,424 B2 and 8,009,351 B2, particulates in each layer of multi-layered structure are arrayed at regular lattice spacing.
    a) This is a must requirement; without it, the entire working principle, as described in the specifications of U.S. Pat. Nos. 7,760,424 B2 and 8,009,351 B2, fails.
    b) Such prior art can be classified as photonic crystals.
2. U.S. Pat. Nos. 7,760,424 B2 and 8,009,351 B2 relies on the Bragg's law for the description of infrared wave reflections.
    a) Within the frame work of Bragg's law, the lattice constant (or lattice spacing) determines the wavelength of reflected waves.
    b) This is a characteristic typical of photonic crystals.
3. In order to make the visible wavelengths highly transparent, U.S. Pat. Nos. 7,760,424 B2 and 8,009,351 B2 require the following restrictions:

a) The refractive index of particulates and the refractive index of a filler material intervening in spaces between the particulates must be nearly identical.
b) The difference between the refractive index of a filler material and the refractive index of particulates is less than or equal to 0.05. That is, if $n_m=1.5$ is the refractive index of a filler material, then particulates must be chosen from materials with refractive indexes between $n_p=1.45$ and $n_p=1.55$ such that $|n_m-n_p|\leq0.05$.
c) Such restriction forbids the use of metallic particulates, which include aluminum, chromium, cobalt, copper, gold, iridium, lithium, molybdenum, nickel, osmium, palladium, platinum, rhodium, silver, tantalum, titanium, tungsten, and vanadium. On the other hand, most of the oxide materials have refractive indexes between $n_p=1.45$ and $n_1=1.55$, and therefore can be used for the particulates.
4. In U.S. Pat. Nos. 7,760,424 B2 and 8,009,351 B2, the infrared reflection strongly depends on the incoming wave's angle of incidence, a characteristic typical of photonic crystals and a consequence of the Bragg's law.

Following are the specifications of the present invention:
1. In the present invention, particulates are randomly distributed in each layers of the multi-layered coating system.
2. The present invention relies on the Mie scattering theory for the description of infrared wave reflections.
3. In the present invention, particulates are preferably chosen from conductors. Unlike in the case of U.S. Pat. Nos. 7,760,424 B2 and 8,009,351 B2, the filler material and the randomly distributed particulates are not required to have nearly identical refractive indexes.
4. In one or more exemplary embodiments of the present invention, randomly distributed voids are also present along with randomly distributed particulates in each layers of the multi-layered coating system.
5. In the present invention, the infrared reflection has no dependence on the incoming wave's angle of incidence, a characteristic which is typical of systems involving randomly distributed particulates (with or without randomly distributed voids).

Such noticeable differences in the specifications clearly distinguishes the present invention from U.S. Pat. Nos. 7,760,424 B2 and 8,009,351 B2.

The following prior arts on quantum dot technologies are listed here for reference: U.S. Pat. Nos. 8,362,684 B2, 8,395,042 B2, U.S. Pat. No. 2013/0,003,163 A1, and U.S. Pat. No. 2013/0,207,073 A1. Although these prior arts are technologically unrelated to the present invention, there are remarkable similarities in the distribution of particulates in each layers of multi-layered system. Otherwise, the present disclosure and the listed prior arts on quantum dot technologies are based on fundamentally different physics and two should not be overseen as the same.

OBJECTS OF THE INVENTION

The principal object of this invention is to provide a multi-layered coating system that improves insulation against heat loss by reflecting infrared radiation.

SUMMARY OF THE INVENTION

A multi-layered coating system for selectively reflecting electromagnetic waves in particular range of wavelengths while transmitting electromagnetic waves with wavelengths outside of the specified range is disclosed. The disclosed multi-layered coating system involves multiple layers of sub-coated layers, wherein each subcoating layer comprises a plurality of well separated spherical particulates and a plurality of well separated spherical voids that are randomly distributed inside of said subcoating layer. The selective filtering of electromagnetic wavelengths in the disclosed multi-layered coating system depends on the particular arrangement of sub-coating layers, wherein each subcoating layer is characterized by spherical particulates and spherical voids of unique diameter sizes.

The multi-layered coating system disclosed here can be readily applied to all types of textiles as well as any surfaces that can be coated, which include automobiles, homes and buildings (walls, windowpanes, roofs, etc.), oil pipelines, gas pipelines, water pipelines, furniture, paper, electronics, and various household goods and appliances, etc.

Various exemplary embodiments are now summarized below.

In the first exemplary embodiment, a coating system comprising multiple layers of subcoatings, wherein a first layer is positioned above a substrate, a second layer is positioned above the first layer, a third layer is positioned above the second layer, and a fourth layer is positioned above the third layer, is provided. The first layer includes a plurality of well separated spherical particulates of radius $a_1$ that are randomly distributed, and a filler material of refractive index $n_1$ intervening in the spaces between said spherical particulates. The second layer includes a plurality of well separated spherical particulates of radius $a_2>a_1$ that are randomly distributed, and a filler material of refractive index $n_1$ intervening in the spaces between said spherical particulates. The third layer includes a plurality of well separated spherical particulates of radius $a_3>a_2$ that are randomly distributed, and a filler material of refractive index $n_1$ intervening in the spaces between said spherical particulates. And the fourth layer includes a plurality of well separated spherical particulates of radius $a_4>a_3$ that are randomly distributed, and a filler material of refractive index $n_1$ intervening in the spaces between said spherical particulates.

In the second exemplary embodiment, a coating system comprising multiple layers of subcoatings, wherein a first layer is positioned above a substrate, a second layer is positioned above the first layer, a third layer is positioned above the second layer, and a fourth layer is positioned above the third layer, is provided. The first layer includes a plurality of well separated spherical particulates of radius $a_1$ and a plurality of well separated spherical voids of radius $b_1>a_1$ that are randomly distributed, and a filler material of refractive index $n_1$ intervening in the spaces between said spherical particulates and spherical voids. The second layer includes a plurality of well separated spherical particulates of radius $a_2>a_1$ and a plurality of spherical voids of radius $b_2$ (where $b_2>a_2$ and $b_2>b_1$) that are randomly distributed, and a filler material of refractive index $n_1$ intervening in the spaces between said spherical particulates and spherical voids. The third layer includes a plurality of well separated spherical particulates of radius $a_3>a_2$ and a plurality of spherical voids of radius $b_3$ (where $b_3>a_3$ and $b_3>b_2$) that are randomly distributed, and a filler material of refractive index $n_1$ intervening in the spaces between said spherical particulates and spherical voids. And the fourth layer includes a plurality of well separated spherical particulates of radius $a_4>a_3$ and a plurality of spherical voids of radius $b_4$ (where $b_4>a_4$ and $b_4>b_3$) that are randomly distributed, and a filler material of refractive index $n_1$ intervening in the spaces between said spherical particulates and spherical voids.

In the third exemplary embodiment, a coating system comprising multiple layers of subcoatings, wherein a first layer is positioned above a substrate, a second layer is positioned above the first layer, a third layer is positioned above the second layer, and a fourth layer is positioned above the third layer, is provided. The first layer includes a plurality of well separated spherical particulates of radius $c_1$ that are randomly distributed, and a filler material of refractive index $n_1$ intervening in the spaces between said spherical particulates. The second layer includes a plurality of well separated spherical particulates of radius $c_1$ that are randomly distributed, and a filler material of refractive index $n_2 > n_1$ intervening in the spaces between said spherical particulates. The third layer includes a plurality of well separated spherical particulates of radius $c_1$ that are randomly distributed, and a filler material of refractive index $n_3 > n_2$ intervening in the spaces between said spherical particulates. And the fourth layer includes a plurality of well separated spherical particulates of radius $c_1$ that are randomly distributed, and a filler material of refractive index $n_4 > n_3$ intervening in the spaces between said spherical particulates.

In the fourth exemplary embodiment, a coating system comprising multiple layers of subcoatings, wherein a first layer is positioned above a substrate, a second layer is positioned above the first layer, a third layer is positioned above the second layer, and a fourth layer is positioned above the third layer, is provided. The first layer includes a plurality of well separated spherical particulates of radius $c_1$ and a plurality of well separated spherical voids of radius $c_2 > c_1$ that are randomly distributed, and a filler material of refractive index $n_1$ intervening in the spaces between said spherical particulates and spherical voids. The second layer includes a plurality of well separated spherical particulates of radius $c_1$ and a plurality of well separated spherical voids of radius $c_2 > c_1$ that are randomly distributed, and a filler material of refractive index $n_2 > n_1$ intervening in the spaces between said spherical particulates and spherical voids. The third layer includes a plurality of well separated spherical particulates of radius $c_1$ and a plurality of well separated spherical voids of radius $c_2 > c_1$ that are randomly distributed, and a filler material of refractive index $n_3 > n_2$ intervening in the spaces between said spherical particulates and spherical voids. And the fourth layer includes a plurality of well separated spherical particulates of radius $c_1$ and a plurality of well separated spherical voids of radius $c_2 > c_1$ that are randomly distributed, and a filler material of refractive index $n_4 > n_3$ intervening in the spaces between said spherical particulates and spherical voids.

The materials for substrate may be selected from a group consisting of conductive materials, dielectric materials, ceramic materials, composite materials, semiconductor materials, polymeric materials, and textiles.

The filler materials may be selected from a group consisting of dielectric materials, ceramic materials, composite materials (composite mixtures), and polymeric materials.

The materials for each spherical particulate may be selected from a group consisting of conductive materials, dielectric materials, and semiconductor materials.

Each spherical particulate may be formed of a solid material, a hollow conductive shell, a dielectric core surrounded by a conductive shell, or formed of a conductive core surrounded by a dielectric shell.

Each spherical void may be formed of a hollow dielectric shell, wherein the cavity may be filled with a gas or empty.

Each layer in a multi-layered coating system has a thickness ranging from 0.01 microns to 10,000 microns.

Each spherical particulate has a radius ranging from 0.001 microns to 250 microns.

Each spherical void has a cavity radius ranging from 0.002 microns to 500 microns.

In the fifth and sixth exemplary embodiments, the multi-layered coating systems illustrated in the foregoing exemplary embodiments (the first, second, third, and the fourth exemplary embodiments) are sandwiched between a first electrode and a second electrode, wherein a first voltage applied to the first electrode and a second voltage that is different from the first voltage is applied to the second electrode.

The electrodes are formed of plane conductors, wherein the conductors are selected from optically transparent materials that also transmit infrared wavelengths of interest.

The electrodes are formed of conductors, wherein the conductors are patterned with grid or grating structures, or with more complicated patterns such as array of holes or squares, etc. Infrared wavelengths of interest and the visible light are transmitted through the openings in the patterned electrodes.

In the case where electrodes are patterned, the conducting materials for electrodes are not just limited to conductive materials which are optically transparent or transmitting infrared wavelengths of interest, but any conducting materials can be used.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
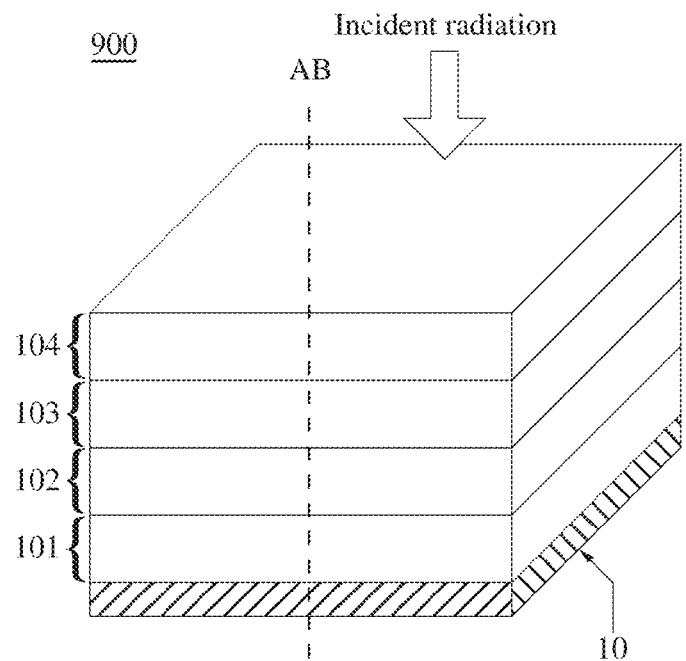
FIG. 1 represents a schematic diagram of a multi-layered coating system according to the invention.

Various exemplary embodiments will now be described in detail with reference made to the accompanying drawings, wherein some of example embodiments are shown with like reference numerals referring to the like elements throughout. It should be understood that there is no intent to limit example embodiments to the particular forms disclosed here, as these exemplary embodiments are merely provided, referring to the figures, to explain aspects of present disclosure. The example embodiments here are to cover all modifications, equivalents, and alternatives that fall within the scope of present disclosure.

In the drawings, the thicknesses of layers, regions, sizes of spherical particulates and spherical voids may be exaggerated for clarity, and the like numerals refer to the like elements throughout the description of figures. The example embodiments here are described with reference made to the cross-sectional illustrations of idealized embodiments. Thus, particular shapes or regions in the example embodiments should not be interpreted as limited to the particular shapes or regions illustrated in the example embodiments, but such shapes or regions may include deviations that result from manufacturing tolerances. For example, a spherical particulate in the example embodiment may actually be represented by a particulate with a spheroid shape that slightly deviate from an ideal sphere in a real device.

Throughout the description, the terms like "first layer," "second layer," "third layer," "fourth layer" and so on are used to refer to particular layers in the example embodiments. Equivalently, the terms like "layer one," "layer two," "layer three," "layer four" and so on would be used instead whenever more appropriate.

In order to more specifically describe example embodiments, various aspects will now be described in detail with reference made to the attached drawings. However, the present invention is not limited to the example embodiments described.

Figure 2:
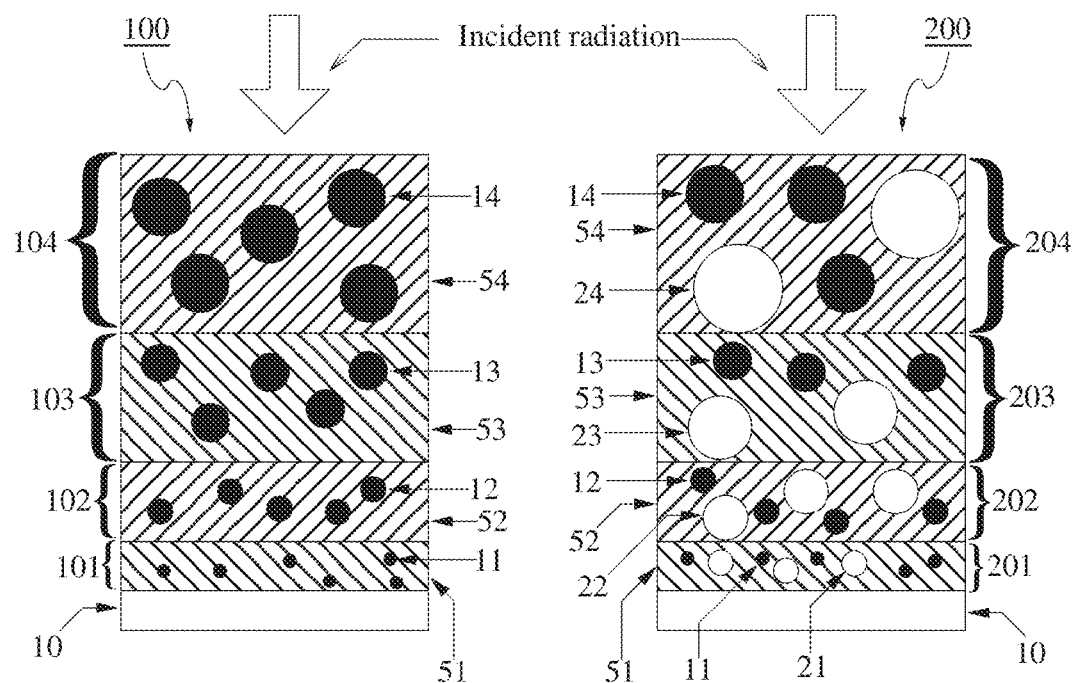
FIG. 2 shows set of embodiments of a multi-layered coating system according to the invention, wherein the cross-sectional view is along the line AB in FIG. 1.

Illustrated in 900 of FIG. 1 is a schematic of a coating system disclosed in this disclosure. Illustrated in FIG. 2 is the first exemplary embodiment 100, wherein comprises a first layer 101 positioned above a substrate 10, a second layer 102 positioned above the first layer 101, a third layer 103 positioned above the second layer 102, and a fourth layer 104 positioned above the third layer 103. The first exemplary embodiment 100 is a cross-sectional view of 900 which was taken along the line AB.

Although there are only four subcoating layers being portrayed in 100 (or 900), there are no limits on the number of subcoating layers in a multi-layered coating system. However, for the sake of concise illustrations, a multi-layered coating system with only four subcoating layers are considered in exemplary embodiments.

In the preferred embodiment 100 of FIG. 2, each subcoating layer (101, 102, 103, and 104) is shown with different level of thickness to emphasize the differences in size distribution of spherical particulates for different subcoating layers. Otherwise there is no limit on how thick each subcoating layer has to be except that a subcoating layer must be at least thick enough to contain a spherical particulate. Put it briefly, each subcoating layer has to be at least thick as the diameter of a spherical particulate it contains.

In an exemplary embodiment 100, as well as in subsequent exemplary embodiments which follow, the spherical particulates in each of subcoating layers are portrayed to have disordered (random) arrangements. Although there is nothing in the operations of present disclosure that prevents spherical particulates in each subcoating layers from having an ordered pattern arrangement, such as lattice arrangements in crystalline structures and photonic crystals, it is preferred that particulates, as well as any voids present, are randomly distributed in each subcoating layers. The reason behind it is simple. When spherical particulates are arranged in an ordered pattern (that is, when particulates are arrayed with a definite lattice spacing), electromagnetic reflections take place profoundly at discrete set of wavelength values which are determined by the lattice constant in accordance with the Bragg's law. Although such characteristic is ideal for tuning applications, where only discrete wavelength values are selected for tuning, it is not suitable for the kind of applications targeted by the current invention. For instance, the infrared portion of electromagnetic spectrum, which portion accounts for most of the heat energies, extends from 0.7 microns to roughly 1,000 microns in wavelengths. For a successful heat blocking operations, infrared electromagnetic energies covering over broad range of wavelengths need to be reflected. Such operations cannot be achieved with spherical particulates that are arrayed at regular lattice spacing, as such configuration only selectively reflects profoundly at discrete set of wavelengths determined by the lattice constant in accordance with the Bragg's law. But when spherical particulates are randomly distributed, the infrared electromagnetic reflections, albeit less profound in magnitude, occur over broad range of wavelengths, which is the preferred characteristic of a successful heat blocking operations.

The multi-layered coating system disclosed here can be directly applied to just about any surfaces. These include surfaces found in houses, appliances, windows, automobiles, textiles, clothes, papers, electronics, ceramics, etc. Hence, if 100 represents a cross-sectional view of coating system (paint) applied on a wall, then substrate 10 represents a wall; whereas if 100 is a cross-sectional view of coating system applied on a textile, then substrate 10 represents a fabric; and if 100 is a cross-sectional view of a coating system applied on a windowpane, then substrate 10 represents a glass.

Materials for substrate 10 may be selected from a group consisting of conductive materials, dielectric materials, ceramic materials, composite materials, semiconductor materials, polymeric materials, and textiles. Here, ceramic materials, composite materials, polymeric materials, and textiles have been listed as if they were materials different from conductive materials, dielectric materials, or semiconductor materials. To clarify any possible misconceptions, all materials can be categorized into the following three: conductive materials, dielectric materials, and semiconductor materials. Now, depending on actual compositions of a material, each of ceramic materials, composite materials, polymeric materials, and textiles can be categorized into conductive materials, dielectric materials, or semiconductor materials. That said, whenever, for example, the term "dielectric material" or "dielectric" is mentioned in the specification, it shall be understood that the term includes all materials that are dielectrics, which also includes any ceramic materials, composite materials, polymeric materials, or textiles that are categorized as a dielectric material. Similarly, whenever the term "conductive material" or "conductor" is mentioned in the specification, it shall be understood that the term includes all materials that are conductors, which also includes any ceramic materials, composite materials, polymeric materials, or textiles that are categorized as a conductive material. And, whenever the term "semiconductor material" or "semiconductor" is mentioned in the specification, it shall be understood that the term includes all materials that are semiconductors, which also includes any ceramic materials, composite materials, polymeric materials, or textiles that are categorized as a semiconductor material.

With that clarified, a list of conductive materials that can be used to form substrate 10 includes, but not limited to, aluminum, chromium, cobalt, copper, gold, iridium, lithium, molybdenum, nickel, osmium, palladium, platinum, rhodium, silver, tantalum, titanium, tungsten, vanadium, an alloy thereof (for instance, aluminum-copper and steel), and a mixture thereof. A list of composite materials that can be used to form substrate 10 includes, but not limited to, concrete, asphalt-concrete, fibre-reinforced polymers, carbon-fibre reinforced plastics, glass-reinforced plastics, reinforced rubber, laminated woods, plywood, paper, fiber glasses, a brick, and various composite glasses. A list of polymeric materials that can be used to form substrate 10 includes, but not limited to, polyacrylamide, polyacrylate, poly-diacetylene, polyepoxide, polyether, polyethylene, polyimidazole, polyimide, polymethylacrylate, polymethylmethacrylate, polypeptide, polyphenylene-vinylene, polyphosphate, polypyrrole, polysaccharide, polystyrene, polysulfone, polythiophene, polyurethane, polyvinyl, and the like. Substrate 10 may also be formed from other polymeric materials such as agarose, cellulose, epoxy, hydrogel, silica gel, silica glass, siloxane, and the like. A list of textiles that can be used to form substrate 10 includes animal textiles, plant textiles, mineral textiles, synthetic textiles, and combinations thereof.

Each subcoating layer in 100 includes a plurality of well separated spherical particulates of radius a that are randomly distributed, and a filler material of refractive index n intervening in the spaces between said spherical particulates. In the exemplary embodiment 100, the subcoating layer 101 includes a plurality of well separated spherical particulates 11 that are randomly distributed, and a filler material 51 intervening in the spaces between said spherical particulates; the subcoating layer 102 includes a plurality of well separated spherical particulates 12 that are randomly distributed, and a filler material 52 intervening in the spaces between said spherical particulates; the subcoating layer 103 includes a plurality of well separated spherical particulates 13 that are randomly distributed, and a filler material 53 intervening in the spaces between said spherical particulates; and the subcoating layer 104 includes a plurality of well separated spherical particulates 14 that are randomly distributed, and a filler material 54 intervening in the spaces between said spherical particulates. In the case of 100, the refractive indexes are same for the filler materials 51, 52, 53, and 54. And, the diameters of spherical particulates 11, 12, 13, and 14 satisfy $d_{11}<d_{12}<d_{13}<d_{14}$, where $d_{11}$, $d_{12}$, $d_{13}$, and $d_{14}$ are the respective diameters for spherical particulates 11, 12, 13, and 14.

The filler materials 51, 52, 53, and 54 may be selected from a group consisting of dielectric materials, ceramic materials, composite materials (composite mixtures), and polymeric materials. A list of these includes, but not limited to, paint, clay, glue, cement, asphalt, polymeric materials, gelatin, glasses, resins, binders, oxides, and combinations thereof. A list of composite mixtures include paint, clay, glue, cement, and the like. A list of polymeric materials include, but not limited to, agarose, cellulose, epoxy, hydrogel, polyacrylamide, polyacrylate, poly-diacetylene, polyepoxide, polyether, polyethylene, polyimidazole, polyimide, polymethylacrylate, polymethylmethacrylate, polypeptide, polyphenylene-vinylene, polyphosphate, polypyrrole, polysaccharide, polystyrene, polysulfone, polythiophene, polyurethane, polyvinyl, and the like. The filler materials 51, 52, 53, and 54 may be also formed from other polymeric materials such as agarose, cellulose, epoxy, hydrogel, silica gel, silica glass, siloxane, and the like. Various resins include synthetic resins such as acrylic and plant resins like mastics. A list of oxide based dielectric materials include, but not limited to, aluminum oxide, beryllium oxide, copper(I) oxide, copper(II) oxide, dysprosium oxide, hafnium(IV) oxide, lutetium oxide, magnesium oxide, scandium oxide, silicon monoxide, silicon dioxide, tantalum pentoxide, tellurium dioxide, titanium dioxide, yttrium oxide, ytterbium oxide, zinc oxide, zirconium dioxide, and the like.

The materials for spherical particulates 11, 12, 13, and 14 may be selected from a group consisting of conductive materials, dielectric materials, and semiconductor materials. A list of conductive materials that can be used to form spherical particulates 11, 12, 13, and 14 includes, but not limited to, aluminum, chromium, cobalt, copper, gold, iridium, lithium, molybdenum, nickel, osmium, palladium, platinum, rhodium, silver, tantalum, titanium, tungsten, vanadium, an alloy thereof (for instance, aluminum-copper and steel), and a mixture thereof. Spherical particulates 11, 12, 13, and 14 may also be formed of composite bodies, such as a core-shell structured spherical particulates, in which a conductive core is surrounded by an insulating shell or vice versa (an insulator core or cavity surrounded by a conducting shell). Although dielectric materials with large refractive indexes or semiconductor materials may also be selected for spherical particulates 11, 12, 13, and 14, conductive materials are preferred choices.

An exemplary embodiment 200 of FIG. 2 is a variant of exemplary embodiment 100 in which randomly distributed spherical voids are introduced in subcoating layers 201, 202, 203, and 204. In exemplary embodiment 200, the diameters of spherical voids from different subcoating layers satisfy $d_{21} < d_{22} < d_{23} < d_{24}$, where $d_{21}$, $d_{22}$, $d_{23}$, and $d_{24}$ are diameters for spherical voids 21, 22, 23, and 24, respectively. Same as in 100, diameters of spherical particulates from different subcoating layers satisfy $d_{11} < d_{12} < d_{13} < d_{14}$. And, diameters of spherical particulates and spherical voids are related by $d_{11} < d_{21}$, $d_{12} < d_{22}$, $d_{13} < d_{23}$, and $d_{14} < d_{24}$.

In the limit number of randomly distributed spherical voids becomes very large and the diameter of each voids becomes very small, each subcoating layers in a multi-layered coating system of exemplary embodiment 200 becomes an aerogel structure comprising randomly distributed spherical particulates. An aerogel is a synthetic porous material.

Spherical voids 21, 22, 23, and 24 may be formed of hollow dielectric shells, which may also be filled with gas.

In exemplary embodiments 100 and 200, as well as in other embodiments, spherical particulates in each subcoating layer are portrayed to have one identical diameter size. For example, in subcoating layer 101, spherical particulate 11 has diameter size of $d_{11}$. In reality, it is extremely difficult, if not impossible, to manufacture two different spherical particulates with same diameter size. Therefore, diameters $d_{11}$, $d_{12}$, $d_{13}$, and $d_{14}$ must be interpreted as average diameters, where $d_{11}$ is an average diameter size for a plurality of spherical particulate 11, $d_{12}$ is an average diameter size for a plurality of spherical particulate 12, $d_{13}$ is an average diameter size for a plurality of spherical particulate 13, and $d_{14}$ is an average diameter size for a plurality of spherical particulate 14. Likewise, the diameters for spherical voids in exemplary embodiment 200 must be also interpreted as average diameters. For instance, $d_{21}$ is an average diameter size for a plurality of spherical void 21, $d_{22}$ is an average diameter size for a plurality of spherical void 22, $d_{23}$ is an average diameter size for a plurality of spherical void 23, and $d_{24}$ is an average diameter size for a plurality of spherical void 24.

Figure 3:
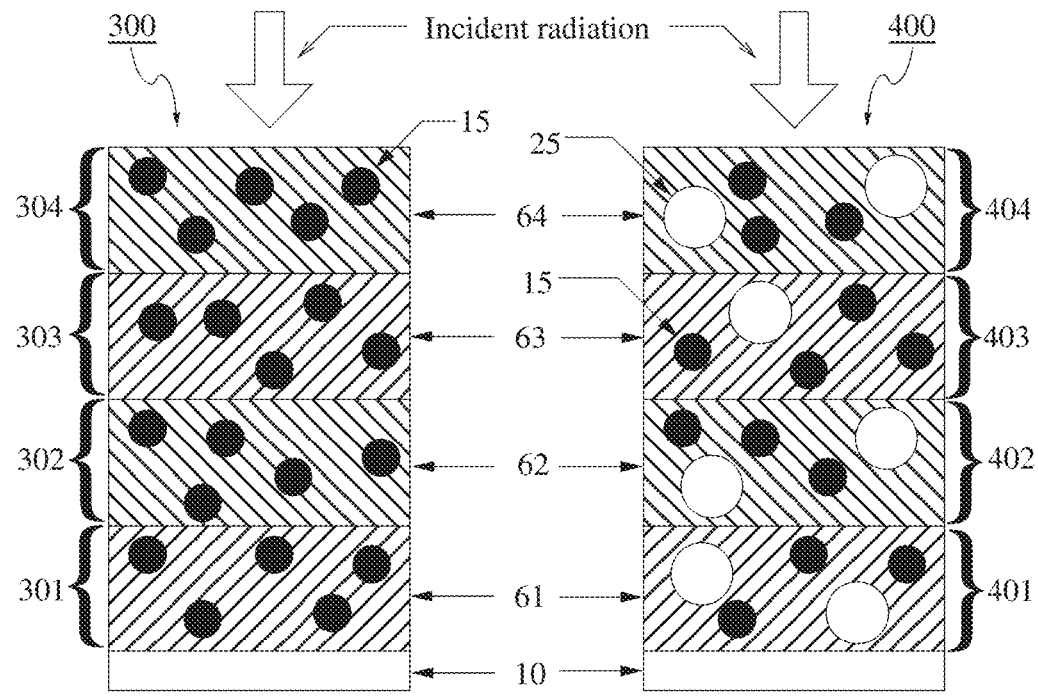
FIG. 3 shows another set of embodiments of a multi-layered coating system according to the invention, wherein the cross-sectional view is along the line AB in FIG. 1.

In an another exemplary embodiment 300, FIG. 3, spherical particulates of one diameter size are randomly distributed across different subcoating layers 301, 302, 303, and 304, where each subcoating layers have different refractive indexes. A three-dimensional schematic of 300 may be visualized from 900 of FIG. 1 by identifying layers 101, 102, 103, and 104 respectively with layers 301, 302, 303, and 304. In that regard, exemplary embodiment 300 represents a cross-sectional view of 900 along the line AB. Refractive indexes for different subcoating layers in 300 satisfy $n_{61} < n_{62} < n_{63} < n_{64}$, where $n_{61}$, $n_{62}$, $n_{63}$, and $n_{64}$ represent refractive index for the filler materials 61, 62, 63, and 64, respectively.

The filler materials 61, 62, 63, and 64 may be selected from those listed for the filler materials 51, 52, 53, and 54.

Materials for spherical particulate 15 may be selected from those listed for spherical particulates 11, 12, 13, and 14.

An exemplary embodiment 400 of FIG. 3 is a variant of exemplary embodiment 300 in which randomly distributed spherical voids are also present in subcoating layers 401, 402, 403, and 404. As in the case of exemplary embodiment 300, the refractive indexes for subcoating layers satisfy $n_{61} < n_{62} < n_{63} < n_{64}$. However, the diameter of spherical voids is chosen such that it is larger than the diameter of spherical particulate 15. The diameters of spherical particulate 15 and spherical void 25 in exemplary embodiment 400 satisfy $d_{15} < d_{25}$, where $d_{15}$ and $d_{25}$ represent the diameters for spherical particulate 15 and spherical void 25, respectively.

Materials for spherical void 25 may be selected from those listed for spherical voids 21, 22, 23, and 24.

Although the embodiment 300 (400) has been described here as an alternative to the preferred embodiment 100 (200), the multi-layered coating system based on 300 (400) suffers from internal reflections which occur at the interfaces of different subcoating layers due to different refractive indexes for the subcoating layers. Such internal reflections inevitably contribute to the self-heating of the multi-layered coating system.

Hereinafter, operations of multi-layered coating system according to one or more exemplary embodiments will be described in detail.

Figure 4:
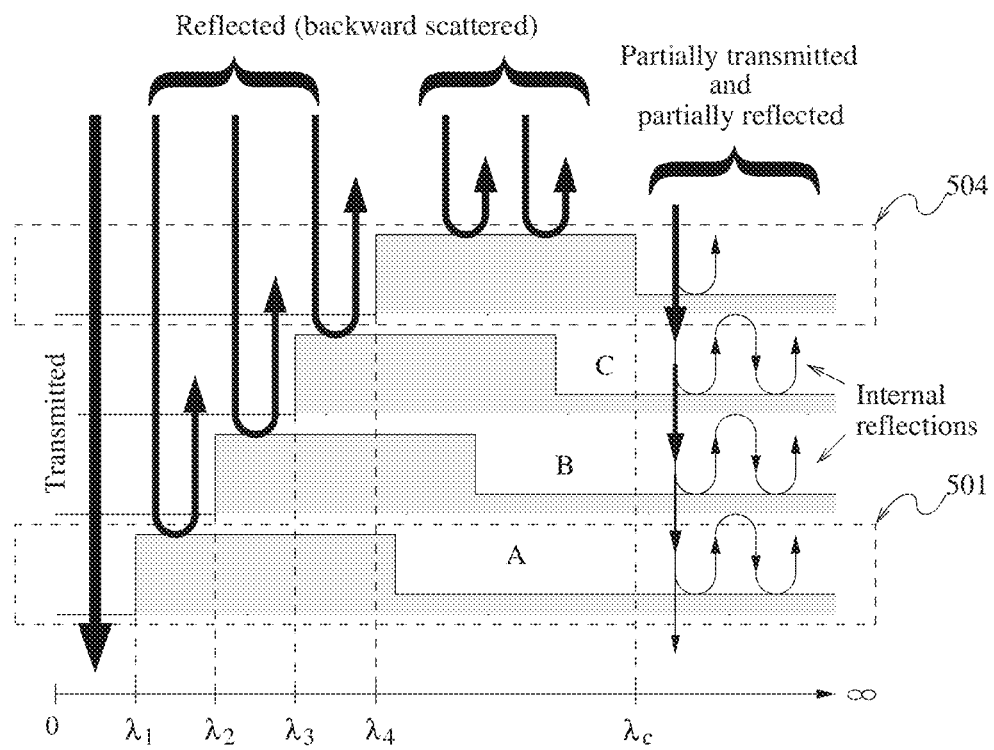
FIG. 4 is a diagram illustrating an exemplary operation of selective blocking (or reflection) of electromagnetic radiation in a particular range of wavelengths while transmitting the remainder.

Depicted in FIG. 4 is a schematic illustration which shows operations of transmission and reflection in an ideal multi-layered coating system 100, as opposed to in physical (realistic) multi-layered coating system 100. Although the transmission and reflection operations illustrated in FIG. 4 might be too ideal for a physical multi-layered coating system, the illustration provides a concise description of how wavelengths are selectively filtered in a multi-layered coating system. It shall be shown later that a physical multi-layered coating system also exhibits equivalent characteristics portrayed in FIG. 4. That in mind, operations of transmission and reflection in an ideal multi-layered coating system is now described.

An ideal multi-layered coating system comprises ideal subcoating layers. Thus an ideal multi-layered coating system 100 is comprised of ideal subcoating layers 101, 102, 103, and 104. The operations of transmission and reflection in an ideal multi-layered coating system 100 is depicted in FIG. 4, where 501 describes the operations of transmission and reflection associated with an ideal subcoating layer 101 and 504 describes the similar operations for an ideal subcoating layer 104. The remaining two operations schemes, which have not been explicitly labeled in FIG. 4, can be readily associated with ideal subcoating layers 102 and 103.

In an ideal subcoating layer 104, an incident electromagnetic wave of wavelength $\lambda$ is fully transmitted for $\lambda < \lambda_4$, fully reflected for $\lambda_4 \leq \lambda \leq \lambda_c$, and is partially transmitted and partially reflected for $\lambda > \lambda_c$. Subcoating layers with such wavelength filtering characteristics have useful applications in windowpanes, where it is highly desired to reflect heat or infrared electromagnetic waves while transmitting electromagnetic waves from the visible spectrum and wavelengths used by broadcasting and communication industries.

The width of a reflecting region in the subcoating layer is finite. For an ideal subcoating layer 104, the width of a reflecting region is given by $\Delta\lambda = \lambda_c - \lambda_4$. In general, physical subcoating layer has a very narrow width $\Delta\lambda$ for the reflection region. For that reason, a single subcoating layer, often in the heat blocking applications, is not sufficient to block all of unwanted wavelengths in the infrared spectrum. Fortunately, the reflecting region in a subcoating layer can be shifted in the wavelength domains by controlling the diameters of spherical particulates comprised in the subcoating layer. To illustrated this, consider 501 (see FIG. 4) which describes operations of transmission and reflection in an ideal subcoating layer 101. The result of 501 can be compared with the result in 504, which describes operations of transmission and reflection in an ideal subcoating layer 104 for the spherical particulates of larger diameter size. Comparing the two, it can be noticed that the beginning edge of a reflecting region in 501 occurs at $\lambda = \lambda_1$, where $\lambda_4 > \lambda_1$. Such shift in the beginning edge for a reflecting region in 501 is attributed to the smaller spherical particulate 11 which are randomly distributed inside of a subcoating layer 101. In exemplary embodiment 100, diameters of spherical particulates from different subcoating layers satisfy $d_{11} < d_{12} < d_{13} < d_{14}$; and such arrangement of spherical particulates in an ideal multi-layered coating system 100 reflects the transmission and reflection operations shown in FIG. 4.

A single subcoating layer may not be sufficient to reflect all of unwanted wavelengths due to its finite width $\Delta\lambda$ for the reflecting region. However, subcoating layers, such as 101, 102, 103, and 104, may be stacked together to form a multi-layered coating system which has a larger effective width $(\Delta\lambda)_{eff}$ for the reflecting region. For instance, an ideal multi-layered coating system 100, wherein operations of transmission and reflection are depicted in FIG. 4, has an effective width of $(\Delta\lambda)_{eff}=\lambda_c-\lambda_1$ for the reflecting region. In an ideal multi-layered coating system 100, any electromagnetic waves of unwanted wavelengths that has not been reflected by the subcoating layer 104 eventually gets reflected by the subsequent subcoating layers 101, 102, and 103. The reflected waves belonging to the wavelength domain $\lambda_1 \lesssim \lambda \lesssim \lambda_4$ in FIG. 4 are free from being trapped inside of multi-layered coating system 100, as there are no reflecting regions in the path of travel for these electromagnetic waves. For example, suppose an electromagnetic wave in the wavelength domain $\lambda_1 \lesssim \lambda \lesssim \lambda_2$ gets reflected off a subcoating layer 101 (see 501 in FIG. 4). Such reflected electromagnetic wave would travel across the subcoating layers 102, 103, and 104 with no internal reflections, finally escaping the multi-layered coating system 100. There are no internal reflections taking place for there are no reflecting regions in its path of travel. It is also for that reason any reflected electromagnetic waves belonging to the wavelength domain $\lambda_1 \lesssim \lambda \lesssim \lambda_4$ does not contribute to the self-heating in a multi-layered coating system. However, electromagnetic waves in the wavelength domain $\lambda > \lambda_c$ are partially transmitted and partially reflected as they travel across the subsequent subcoating layers. Such electromagnetic waves are subject to internal reflections at the interfaces between the subcoating layers. As consequence, these electromagnetic waves contribute to the self-heating of multi-layered coating system 100. Fortunately, electromagnetic waves in the wavelength domain $\lambda > \lambda_c$ are not as energetic as those in the wavelength domain $\lambda \lesssim \lambda_4$. These electromagnetic waves in the wavelength domain $\lambda > \lambda_c$ contribute negligibly in the heating of a multi-layered coating system.

In the foregoing illustrations, the multi-layered coating system has been irradiated at the top. In the case of exemplary embodiment 100, the top is subcoating layer 104 and the bottom is the substrate 10. The multi-layered coating system 100 can also be irradiated from the bottom and much of the basic operations of transmission and reflection of electromagnetic waves would still be described as illustrated in FIG. 4. For instance, incident electromagnetic waves with wavelengths satisfying $0 < \lambda < \lambda_1$ would still be fully transmitted across the subcoating layers whereas those waves with wavelengths satisfying $\lambda > \lambda_c$ would be partially transmitted and partially reflected. However, a major modification in the operations of transmission and reflection takes place when the direction of incidence electromagnetic wave is reversed in FIG. 2. Although incident electromagnetic waves with wavelengths satisfying $\lambda_1 \lesssim \lambda \lesssim \lambda_4$ are still fully reflected, those waves with wavelengths satisfying $\lambda_4 < \lambda \lesssim \lambda_c$ in FIG. 4 are partially reflected and partially transmitted for the case where the direction of incidence electromagnetic wave is reversed in FIG. 2. Electromagnetic waves that are partially transmitted into regions A, B, and C suffer from internal reflections which take place in between the different subcoating layers. Such internal reflections contribute to the self-heating of multi-layered coating system.

Figure 5:
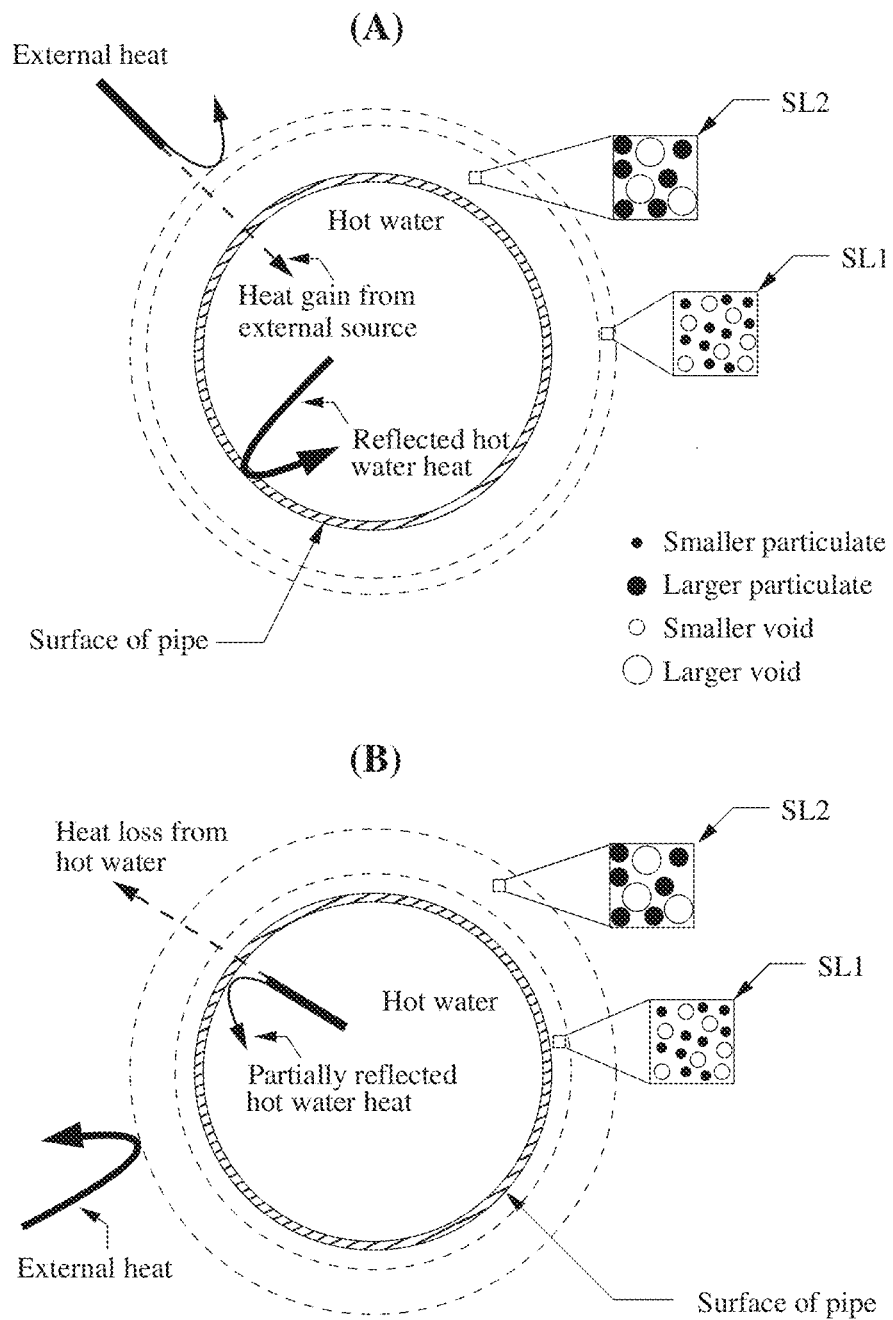
FIG. 5 shows two cases where multi-layered coating system is applied to a pipe containing hot water.

Illustrated in FIG. 5A is a case where the multi-layered coating system is applied to a pipe carrying a heated water. In this illustration, the surface of pipe is first coated with subcoating layer SL2 and then the subcoating layer SL2 is coated with subcoating layer SL1. With such arrangement of subcoating layers, the "Hot water" inside of pipe can be properly insulated from the colder ambient temperature outside of the pipe. Assuming the SL2 is an ideal subcoating layer, whose operations of wave transmission and reflection are described in the foregoing, the heat waves from the "Hot water" are internally reflected inside of the pipe by the subcoating layer SL2, thereby preventing the "Hot water" from losing heat. On the other hand, any heat from the external sources are partially transmitted through the subcoating layer SL1, and that results in the internal reflections within SL1 which give rise to the heating of the entire multi-layered coating system (recall the illustrations with regions A, B, and C in FIG. 4). Such processes can only result in addition of more heat to the "Hot water" via non-radiative thermal processes (for instance, heat transfer by direct thermal conduction) although the amount of actual heat energy transferred to the "Hot water" depends on the temperature state of external heat sources.

Illustrated in FIG. 5B is an opposite situation, wherein the arrangement of subcoating layers SL1 and SL2 are reversed from the case in FIG. 5A. Under such arrangement of subcoating layers, the "Hot water" inside of pipe constantly loses heat. For example, heat from the "Hot water" are partially transmitted through the subcoating layer SL1, and that results in the internal reflections within SL1 which, in turn, end up heating the entire multi-layered coating system. In such configuration, heat energy loss from a direct thermal conduction process, as opposed to a radiative thermal process, can be increased.

Hereinafter, the operations of transmission and reflection in physical multi-layered coating system is described in detail.

The physical subcoating layer 104, as opposed to an ideal subcoating layer 104, does not have such sharply defined transmission and reflection regions shown in 504. However, when physical subcoating layers are stacked each other to form a multi-layered coating system, the resulting operations of transmission and reflection portray most of characteristics discussed in FIG. 4 for an ideal coating system.

Figure 6:
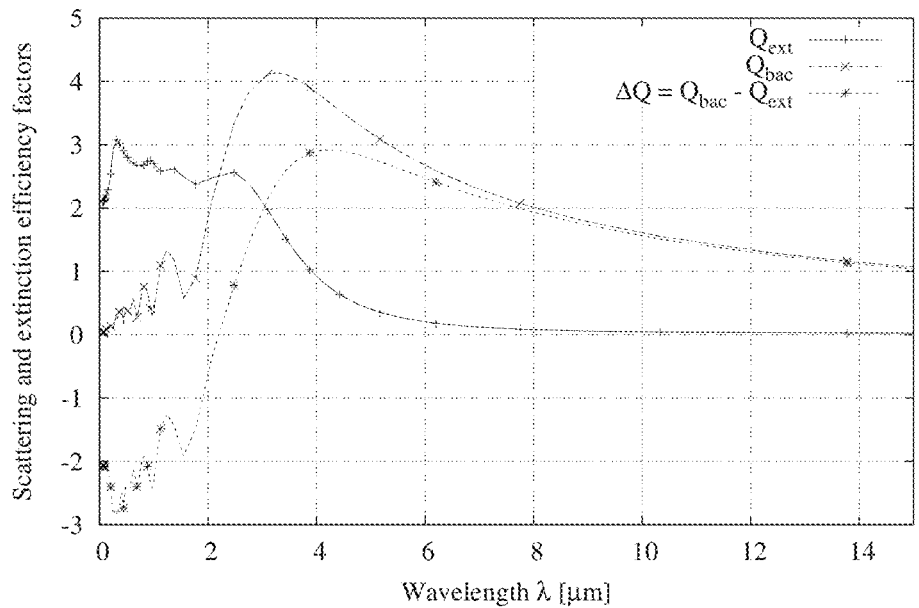
FIG. 6 is a plot of ($Q_{ext}$, $Q_{bac}$, $\Delta Q = Q_{bac} - Q_{ext}$) versus wavelength, wherein an aluminum spherical particulate of radius a=300 nm embedded in a medium (filler material) having a refractive index n=1.4962 is irradiated with electromagnetic radiation.

Illustrated in FIG. 6 are the plots of backward scattering (or back-scattering) efficiency factor $Q_{bac}$, extinction efficiency factor $Q_{ext}$, and the difference function $\Delta Q = Q_{bac} - Q_{ext}$ which were obtained from a configuration in which an aluminum spherical particulate of radius a=300 nm is embedded in a medium (filler material) of refractive index n=1.4962 and is irradiated with an incidence electromagnetic wave of intensity $I_o$. The Mie theory has been utilized for the calculations of $Q_{bac}$ and $Q_{ext}$. That said, two distinct regions can be readily identified in the plot of $\Delta Q$ in FIG. 6. The first region I, which has a specified range of $0 < \lambda < 2.2$ μm, is characterized by a negative value for $\Delta Q$ ($\Delta Q < 0$) whereas the second region II, which has a specified range of $2.2$ μm $\lesssim \lambda \lesssim 15$ μm, is characterized by a positive value for $\Delta Q$ ($\Delta Q > 0$). Although not immediately apparent in FIG. 6, the value of $\Delta Q$ approaches zero for waves with sufficiently large wavelengths. In the case of FIG. 6, such waves correspond to those with wavelengths satisfying $\lambda \gg 15$ μm. Such region in which $\Delta Q$ approaches zero can be identified as the third region III.

Figure 7:
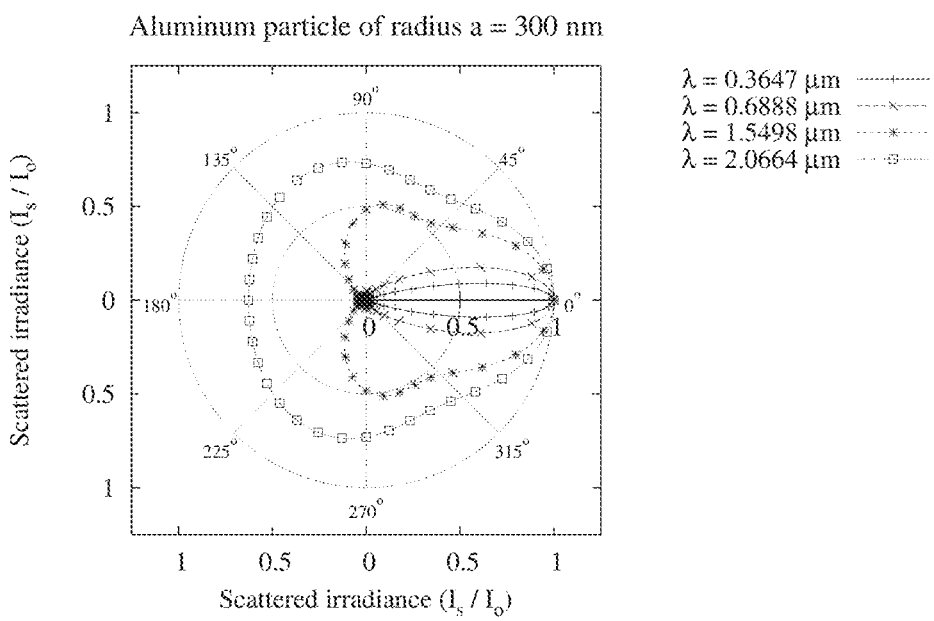
FIG. 7 is a polar plot profile of scattered irradiance corresponding to a case in FIG. 6, wherein an aluminum spherical particulate of radius a=300 nm embedded in a medium (filler material) having a refractive index n=1.4962 is irradiated from the left.
Figure 8:
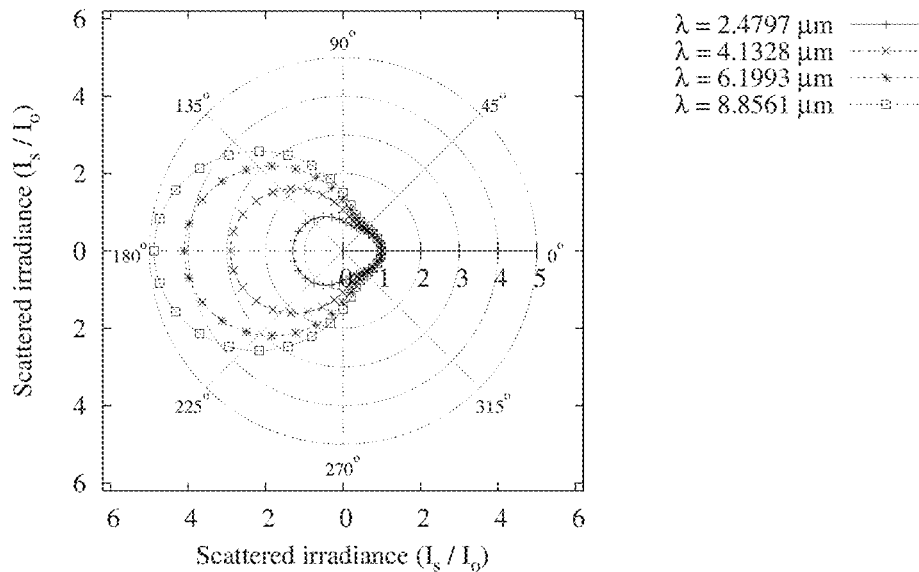
FIG. 8 is a polar plot profile of scattered irradiance corresponding to a case in FIG. 6, wherein an aluminum spherical particulate of radius a=300 nm embedded in a medium (filler material) having a refractive index n=1.4962 is irradiated from the left.

The correspondence between the regions of $\Delta Q$ plot in FIG. 6 and the regions of transmission and reflection operations illustrated in 504 (FIG. 4) is demonstrated for the selected wavelengths from regions I and II. In the calculation, an aluminum spherical particulate of radius a=300 nm, which is embedded in a medium (filler material) of refractive index n=1.4962, is irradiated with an electromagnetic wave of intensity $I_o$. For the visual demonstration of forward and backward scattered waves, the ratio of scattered wave intensity $I_s$ and the incidence wave intensity $I_o$ has been plotted in the polar graph for each of the selected wavelengths from the aforementioned regions I and II. The results for wavelengths selected from the region I are shown in FIG. 7 and the results for wavelengths selected from the region II are shown in FIG. 8, where in both polar graphs an aluminum particulate is located at the center and is irradiated from the left. The results in FIG. 7 and FIG. 8 reveal that waves from the region I are strongly forward scattered (i.e., transmitted) whereas the waves from the region II are dominantly backward scattered (i.e., reflected). Hence, the region I in FIG. 6 can be associated with the wavelength domain $0<\lambda<\lambda_4$ in 504; and the region II in FIG. 6 can be associated with the wavelength domain $\lambda_4 \leq \lambda \leq \lambda_c$ in 504. Although not immediately apparent in FIG. 6 and FIG. 8, the ratio of scattered wave intensity $I_s$ and the incidence wave intensity $I_o$ approaches a unity for wavelengths that are sufficiently large. In the case of FIG. 6, such wavelengths correspond to those satisfying $\lambda \gg 15$ μm. The waves in this region correspond to those waves with wavelengths satisfying $\lambda > \lambda_c$ in 504 of FIG. 4, wherein the waves are partially transmitted and partially reflected with equal magnitudes.

Figure 9:
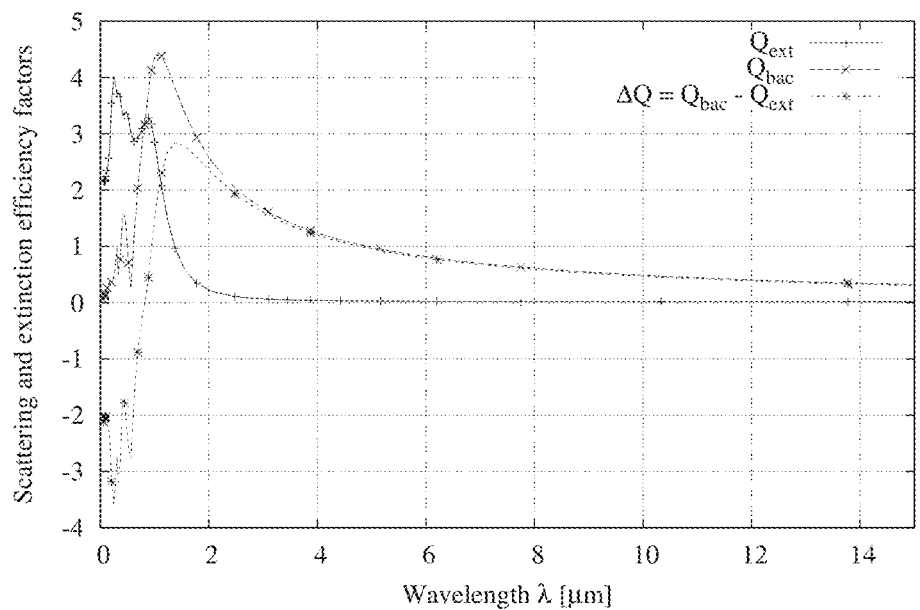
FIG. 9 is a plot of ($Q_{ext}$, $Q_{bac}$, $\Delta Q = Q_{bac} - Q_{ext}$) versus wavelength, wherein an aluminum spherical particulate of radius a=100 nm embedded in a medium (filler material) having a refractive index n=1.4962 is irradiated with electromagnetic radiation.
Figure 10:
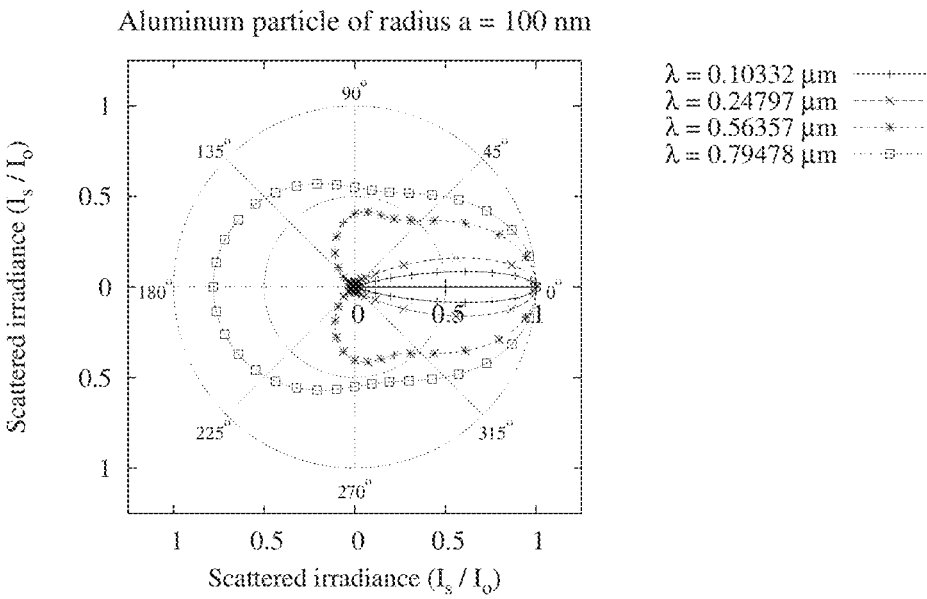
FIG. 10 is a polar plot profile of scattered irradiance corresponding to a case in FIG. 9, wherein an aluminum spherical particulate of radius a=100 nm embedded in a medium (filler material) having a refractive index n=1.4962 is irradiated from the left.
Figure 11:
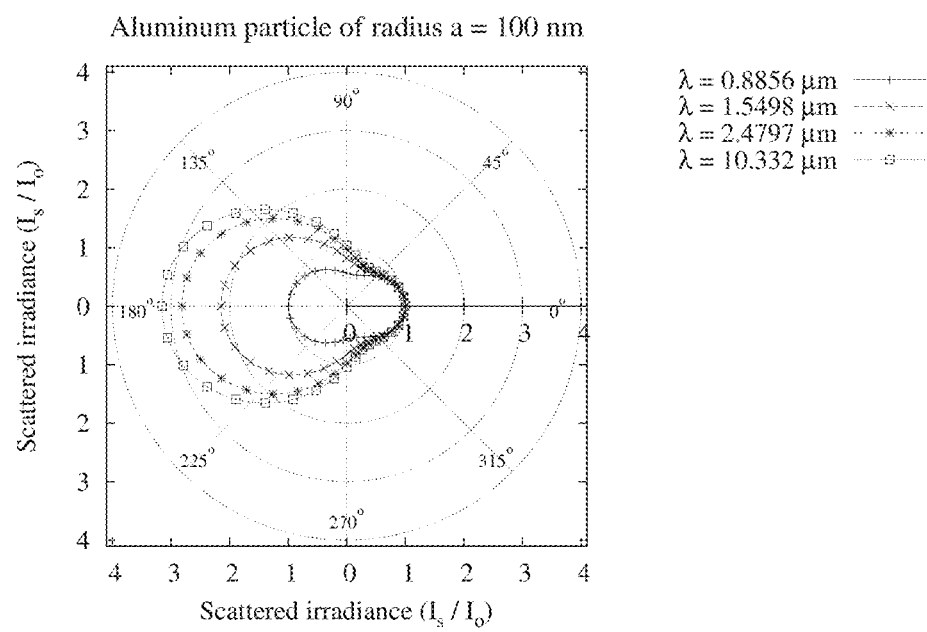
FIG. 11 is a polar plot profile of scattered irradiance corresponding to a case in FIG. 9, wherein an aluminum spherical particulate of radius a=100 nm embedded in a medium (filler material) having a refractive index n=1.4962 is irradiated from the left.
Figure 12:
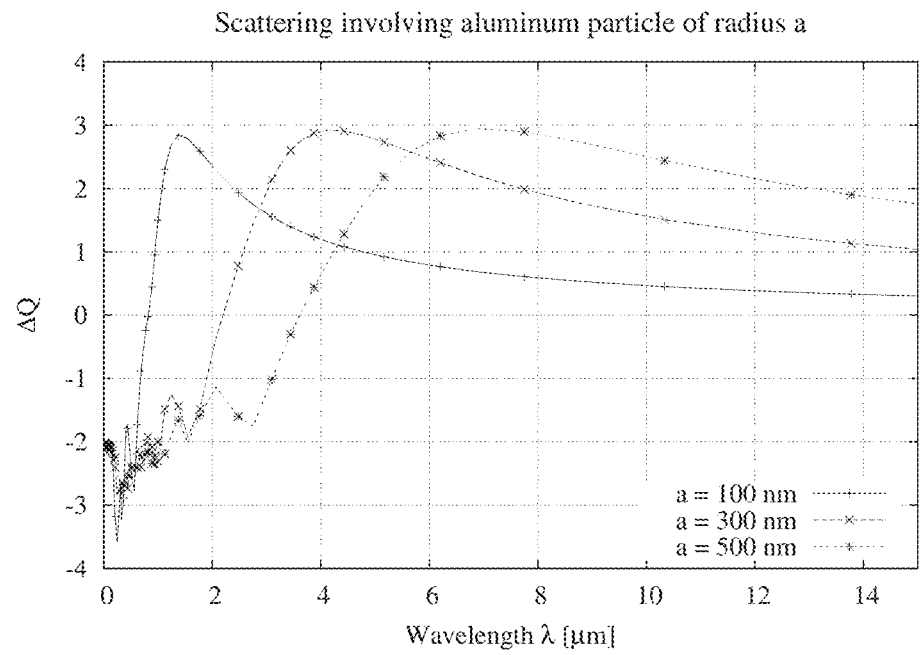
FIG. 12 is a plot of $\Delta Q = Q_{bac} - Q_{ext}$ versus wavelength, wherein an aluminum spherical particulate embedded in a medium (filler material) having a refractive index n=1.4962 is irradiated with electromagnetic radiation.

Illustrated in FIG. 9 are the plots of back-scattering efficiency factor $Q_{bac}$, extinction efficiency factor $Q_{ext}$, and the difference function $\Delta Q = Q_{bac} - Q_{ext}$ which were obtained from a configuration in which an aluminum spherical particulate of radius $a = 100$ nm is embedded in a medium (filler material) of refractive index $n = 1.4962$ and is irradiated with an incidence electromagnetic wave of intensity $I_o$. For the visual demonstration of forward and backward scattered waves, the ratio of scattered wave intensity $I_s$ and the incidence wave intensity $I_o$ has been plotted in the polar graph for each of the selected wavelengths from the regions where $\Delta Q < 0$ and $\Delta Q > 0$ in FIG. 9. The results for wavelengths selected from the regions corresponding to $\Delta Q < 0$ and $\Delta Q > 0$ are respectively shown in FIG. 10 and FIG. 11, where an aluminum spherical particulate is located at the center and is irradiated from the left in both of the polar plots. Just like the case in FIG. 6, results here also show that wavelengths from the region corresponding to $\Delta Q < 0$ are strongly forward scattered whereas the waves from the region corresponding to $\Delta Q > 0$ are strongly backward scattered. However, comparing with the case in FIG. 6, the wavelength location at which $\Delta Q = 0$ is shifted towards the shorter wavelength in FIG. 9. Such characteristic is consistent with the shifting of the "reflecting region" towards the shorter wavelength with a reduced diameter size for the spherical aluminum particulate in FIG. 4 (see FIG. 2 for the diameters of particulates in each subcoating layers). Finally, in FIG. 12, the plots of $\Delta Q$s corresponding to the different radii of aluminum spherical particulates have been obtained for comparison. For the Mie theory calculation of $\Delta Q$s, the following radii have been considered: $a = 100$ nm, $a = 300$ nm, and $a = 500$ nm.

Figure 13:
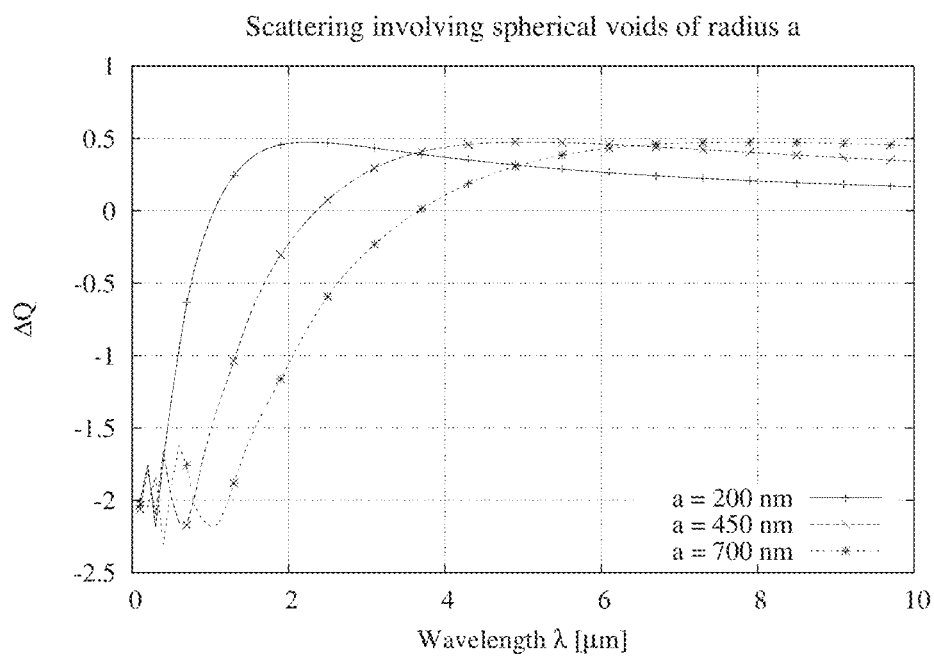
FIG. 13 is a plot of $\Delta Q = Q_{bac} - Q_{ext}$ versus wavelength, wherein a spherical void embedded in a medium (filler material) having a refractive index n=1.4962 is irradiated with electromagnetic radiation.
Figure 14:
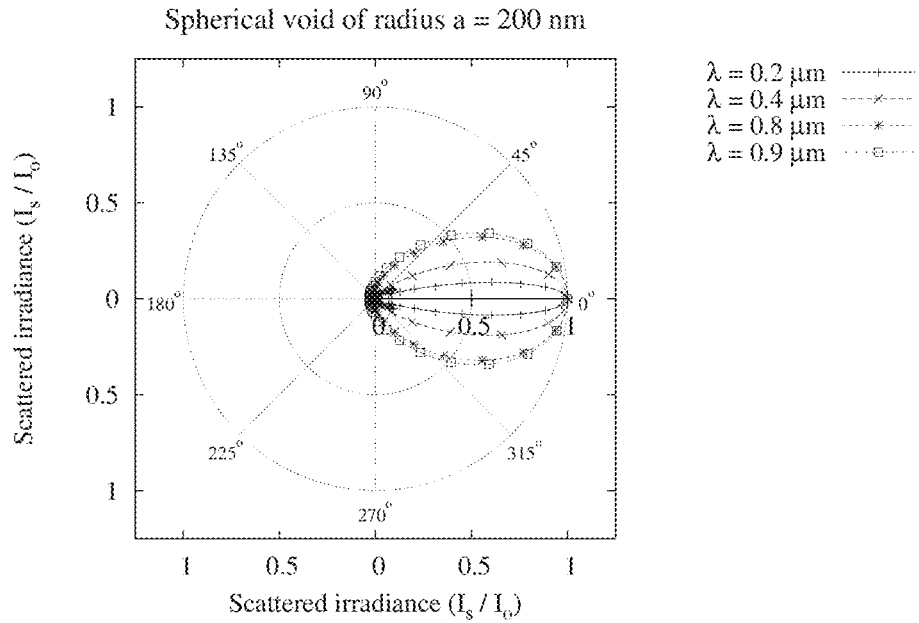
FIG. 14 is a polar plot profile of scattered irradiance corresponding to a case in FIG. 13, wherein a spherical void of radius a=200 nm embedded in a medium (filler material) having a refractive index n=1.4962 is irradiated from the left.
Figure 15:
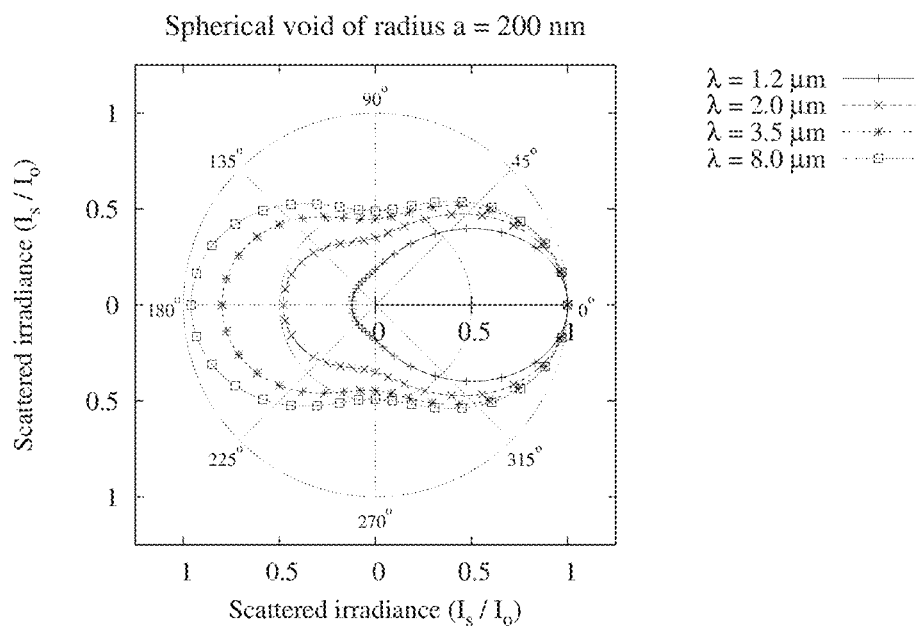
FIG. 15 is a polar plot profile of scattered irradiance corresponding to a case in FIG. 13, wherein a spherical void of radius a=200 nm embedded in a medium (filler material) having a refractive index n=1.4962 is irradiated from the left.

Exemplary embodiment 200 of FIG. 2 utilizes spherical voids to reduce the thermal conductivity associated with a direct thermal conduction. Illustrated in FIG. 13 is a plot of $\Delta Q$ which was obtained for a case where a spherical void of radius a is embedded in a medium (filler material) of refractive index $n = 1.4962$ and is irradiated with an electromagnetic wave of intensity $I_o$. The three different radii for a spherical void considered in the calculations are $a = 200$ nm, $a = 450$ nm, and $a = 700$ nm. For the visual demonstration of forward and backward scattered waves, the ratio of scattered wave intensity $I_s$ and the incidence wave intensity $I_o$ has been plotted in the polar graph for each of the selected wavelengths from the regions where $\Delta Q < 0$ and $\Delta Q > 0$ in FIG. 13. The results for wavelengths selected from the regions corresponding to $\Delta Q < 0$ and $\Delta Q > 0$ are respectively shown in FIG. 14 and FIG. 15, where the spherical void is located at the center and is irradiated from the left in both of the polar plots. Results show that the wavelengths from the region corresponding to $\Delta Q < 0$ are strongly forward scattered (i.e., transmitted) whereas the waves from the region corresponding to $\Delta Q > 0$ are weakly backward scattered. Such result demonstrates that a spherical void embedded in a dielectric medium (filler material) performs poorly in reflecting infrared electromagnetic waves. Nevertheless, the presence of spherical voids in a mixture like paint improves insulation against heat loss by reducing heat transfers that are associated with a direct thermal conduction processes.

Figure 16:
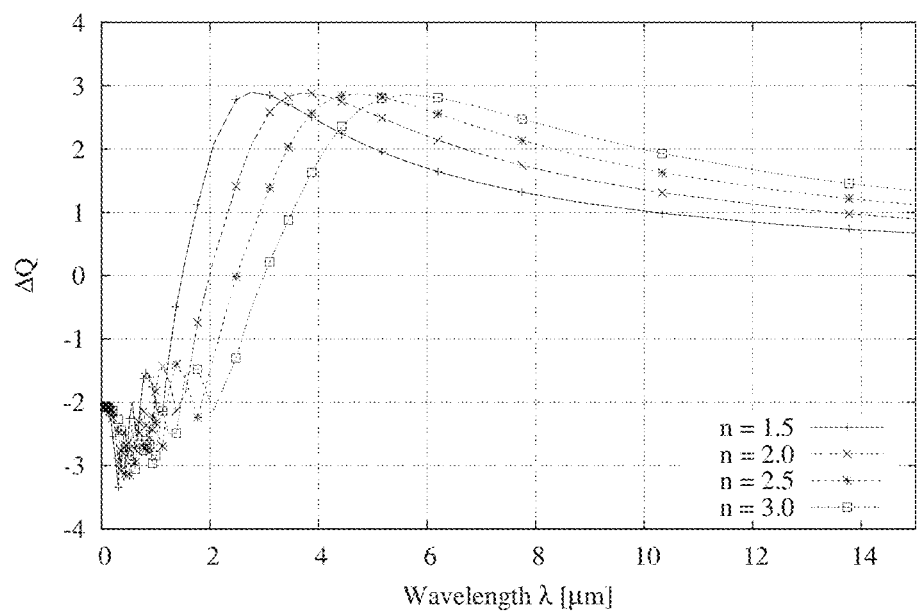
FIG. 16 is a plot of $\Delta Q = Q_{bac} - Q_{ext}$ versus wavelength, wherein an aluminum spherical particulate of radius a=200 nm embedded in a medium (filler material) having a refractive index n is irradiated with electromagnetic radiation.

An exemplary embodiment 300 is an alternative configuration of multi-layered coating system in which randomly distributed spherical particulates of identical diameter size are present in the subcoating layers, where each subcoating layers 301, 302, 303, and 304 respectively comprises filler materials 61, 62, 63, and 64 of different refractive indexes. Illustrated in FIG. 16 are $\Delta Q$s obtained for a configuration in which an aluminum spherical particulate of radius $a = 200$ nm is embedded in a medium (filler material) of refractive index n. The refractive indexes considered for different mediums in FIG. 16 were $n = 1.5$, $n = 2$, $n = 2.5$, and $n = 3$.

Another exemplary embodiment 400 is a modification of exemplary embodiment 300 in which randomly distributed spherical voids are also present in the subcoating layers along with randomly distributed spherical particulates. Although spherical voids are poor at reflecting infrared waves, they still provide improved insulation against heat loss by reducing the thermal conductivity associated with heat transfer by direct conduction.

Although the subcoating layers in the foregoing illustrations contained many spherical particulates, $\Delta Q$s were explicitly calculated from single spherical particulate cases; and those results were utilized to describe operations of transmission and reflection in the subcoating layers. Such analysis is valid provided that spherical particulates in each subcoating layers are sufficiently separated from each other so that interactions between them can be neglected. For a given wavelength of interest, say $\lambda$, two nearest neighbor spherical particulates that are separated by a distance of ~$10\lambda$ can be considered as "sufficiently separated." For example, in an ideal subcoating layer 104 whose operations of wave transmission and reflection are described by 504, said "wavelength of interest, $\lambda$" might be represented by $\lambda = \lambda_4$, which wavelength defines the beginning edge of reflecting region. Similarly, in an ideal subcoating layer 101, where 501 describes operations of wave transmission and reflection, said "wavelength of interest, $\lambda$" might be represented by $\lambda = \lambda_1$ instead. Now, for physical subcoating layers (as opposed to ideal subcoating layers), operations of wave transmission and reflection are characterized by $\Delta Q$ plot. In the case of $\Delta Q$ shown in FIG. 6, said "wavelength of interest, $\lambda$" may be chosen from $\lambda$, where $\lambda$ is bounded by $2 \text{ μm} \leq \lambda \leq 4 \text{ μm}$.

Figure 17:
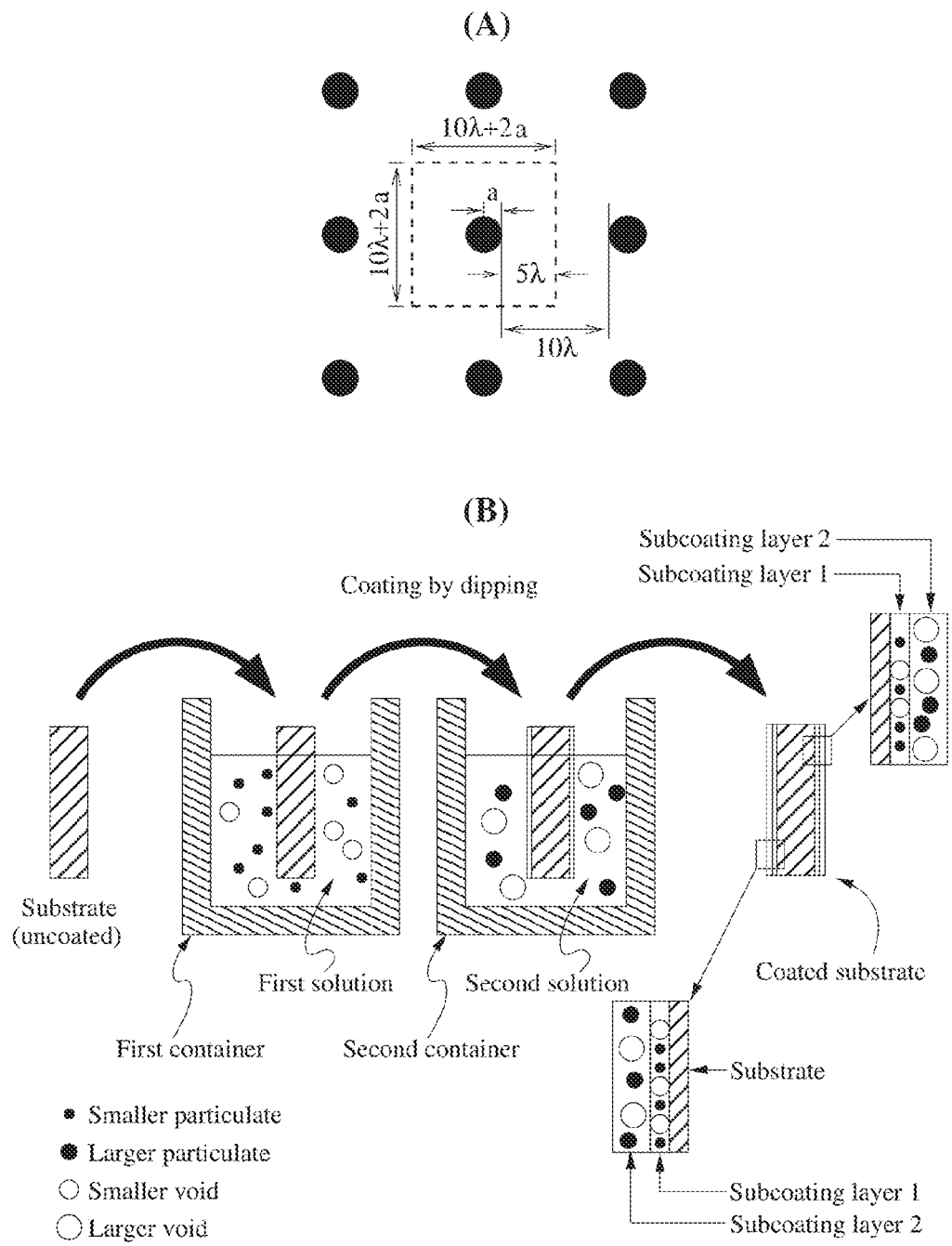
FIG. 17 shows (A) a square lattice and (B) the fabrication process.

In the two dimensional lattice shown in FIG. 17A, where the nearest surface to surface separation between the immediate nearest neighbor spherical particulates is $10\lambda$, the effective area $A_{\mathit{eff}}$ occupied by a spherical particulate of radius a is given by $A_{\mathit{eff}} = (10\lambda + 2a)^2$. In the case of three dimensional cubic lattice, wherein the nearest surface to surface separation between the nearest neighbor spherical particulates is $10\lambda$, the effective volume $V_{\mathit{eff}}$ occupied by a spherical particulate of radius a can be expressed as $V_{\mathit{eff}} = (10\lambda + 2a)^3$. Now, if $V_{layer}$ represents the volume for one of sub-coating layers in 100, then the total number ($N_p$) of spherical particulates in that sub-coating layer is given by $N_p=V_{layer}/V_{eff}$ or $N_p=V_{layer}/(10\lambda+2a)^3$. The total weight of spherical particulates (i.e., the weight of total number of spherical particulates in the sub-coating layer) is given by $W_p=N_p mg$ or $W_p=4.1888 \rho a^3 V_{layer}/(10\lambda+2a)^3$, where g is the gravity constant, $\rho$ is the particulate's mass density, and m, is the single spherical particulate mass defined by $m=\rho(4/3)\pi a^3$ or $m=4.1888 \mu a^3$. The nearest neighbor surface to surface separation length of $10\lambda$ in FIG. 17A is only an approximation to the separation distance at which the interactions between spherical particulates can be neglected. Therefore, any separation distances which is larger than $10\lambda$ also becomes a valid analysis here. In that regard, $N_p$ and $W_p$ can be re-expressed as $N_p \leq V_{layer}/(10\lambda+2a)^3$ and $W_p \leq 4.1888 \rho a^3 g V_{layer}/(10\lambda+2a)^3$.

In general, the scattering of electromagnetic waves in a mixture involving randomly distributed particulates requires an explicit calculation of the scattering solution from a single particulate configuration. And, often such scattering solution is sufficient to explain the scattering phenomenon in those mixtures. For example, the light transmission and reflection in a jar of milk or a cumulus cloud can be quantitatively explained by the Mie theory problem involving a single milk particle in the case of jar of milk or a single raindrop in the case of cumulus cloud. In the foregoing exemplary embodiments, cases where randomly distributed aluminum particulates along with (or without) randomly distributed voids are embedded in a material medium have been considered. From the physics point of view, phenomenon of electromagnetic scattering in such systems involves the single particle Mie theory solutions. The details of physics used in this specification can be found in the following reference: C. Bohren and D. Huffman, "Absorption and Scattering of Light by Small Particles," John Wiley & Sons, Inc., 1998; ISBN 0-471-29340-7.

There is nothing special about the separation distance of $10\lambda$ in FIG. 17A, of course. If instead a different separation distance, say $5\lambda$, between the two nearest neighbor spherical particulates can be considered as the length at which spherical particulates are considered "sufficiently separated," then $N_p$ and $W_p$ would be simply given by $N_p \leq V_{layer}/(5\lambda+2a)^3$ and $W_p \leq 4.1888 \rho a^3 g V_{layer}/(5\lambda+2a)^3$. The separation distance at which two particulates can be considered sufficiently far away so that any interaction between the two can be neglected mostly depend on the type of particulates involved. For instance, if the particulates are charged then the separation distance of $10\lambda$ may not be sufficient to neglect the interactions between the two particulates. Nevertheless, the choice of $10\lambda$ in FIG. 17A makes most type of particulates, including aluminum particulates, "sufficiently separated:"

The $\lambda$ in the foregoing illustrations represents the wavelength of an electromagnetic wave inside of the material medium (filler material) wherein the spherical particulates (and spherical voids) are randomly distributed. The wavelength $\lambda$ in the foregoing $\Delta Q$ plots therefore represents the wavelength of an electromagnetic wave inside of the medium. The corresponding free space wavelength $\lambda_o$ is given by $\lambda_o=n\lambda$, where n is the refractive index of a medium that holds particulates (and voids) inside.

Simple processes involved in the fabrication of multi-layered coating system include (1) preparation of mixtures for each subcoating layers and (2) applying those mixtures on a substrate to form subcoating layers. Illustrated in FIG. 17B are such processes. The first container having a first solution is blended with spherical particulates of one size and spherical voids of another unique size, each respectively labeled as "Smaller particulate" and "Smaller void" in the figure. The second container having a second solution is blended with larger spherical particulates and spherical voids, each respectively labeled as "Larger particulate" and "Larger void" in the figure. In the case where aluminum spherical particulates and hollow glass spheres are blended in an ordinary paint, the "First solution" in the first container and the "Second solution" in the second container of FIG. 17B might be formed of said ordinary paint. The first subcoating layer on a substrate can be formed by dipping the substrate into the first container illustrated in FIG. 17B. The substrate can then be dried and/or cured before getting dipped into the second container to form the second subcoating layer. With a dipping method illustrated in FIG. 17B, multi-layered coating system can be formed on both surfaces of the substrate. For substrates that cannot take the advantage of the dipping method, such as the house surfaces or the surfaces of automobiles, each layers of a multi-layered coating system can be formed on a substrate by a spraying method.

Although the foregoing demonstration involved mixtures, i.e., the "First solution" and the "Second solution" of FIG. 17B, in which an ordinary paint was blended with aluminum particulates and spherical voids, the mixtures for each subcoating layers in the multi-layered coating system can be also prepared by blending aluminum spherical particulates and voids with just about any solutions. These include, but not limited to, solvent base coatings, composite mixtures (such as glue, clay, and the like), polymeric materials (such as polyurethane, elastomers, plastics, gelatin, epoxy, acrylic, polymethylmethacrylate, and the like), as well as various resins and binders like cement to list some. As an alternative illustration, aluminum spherical particulates of one size and spherical voids of another diameter size may be blended in a liquefied PMMA (polymethylmethacrylate) solution. In this particular case, the "First solution" in FIG. 17B may be represented by a liquefied PMMA. The "Second solution" in FIG. 17B may be also represented by a liquefied PMMA but blended with aluminum particulates and spherical voids of larger diameter sizes than those blended in the "First solution." The multi-layered coating system can be formed on a substrate following the dipping processes previously illustrated. In an another alternative illustration, aluminum spherical particulates and voids may be blended in a solution formed of polymeric material such as polyurethane. In this case, the "First solution" and the "Second solution" in FIG. 17B would be represented by polyurethane solutions, wherein each solutions contains aluminum particulates and voids of appropriate diameter sizes. A multi-layered coating system may be formed on a fabric by soaking (or dipping) it in the "First solution" and the "Second solution" following the dipping procedures illustrated previously. Similarly, multi-layered coating system can be formed on a strand of textile fiber by repeating the same procedures. Such threads coated with multi-layered coating system can be used to make heat resistant clothes.

Figure 18:
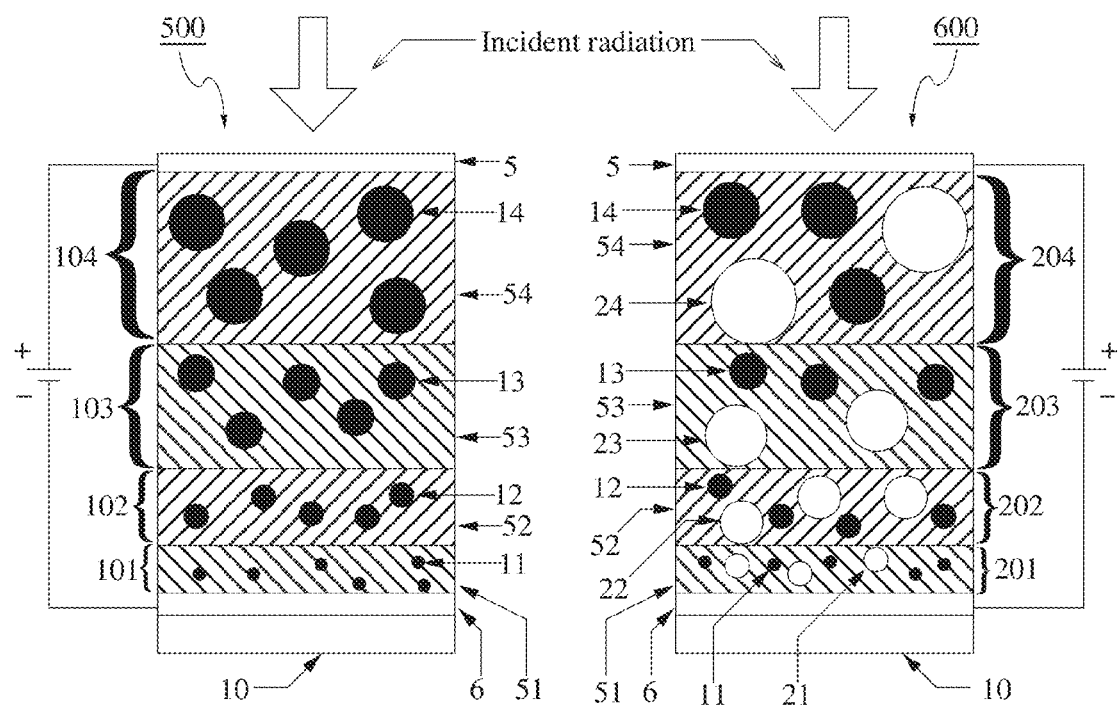
FIG. 18 shows set of embodiments of an active electromagnetic wavelength filter based on a multi-layered coating system according to the invention, wherein the cross-sectional view is along the line AB in FIG. 1.

An exemplary embodiment 500 of FIG. 18 is an illustration of active electromagnetic wavelength filter, wherein the beginning edge of reflecting region (for example, the $\lambda_4$ of 504 in FIG. 4) can be shifted by application of electric field. The electric field between the electrodes 5 and 6 is generated by biasing said electrodes with voltages. Semiconductor materials behave like dielectric materials in the absence of electric field. But when exposed to electric field, semiconductor materials behave like conductive materials. Such property can be utilized to effectively control the wavelength at which the electromagnetic wave starts to get reflected. For example, the value of $\lambda_4$ in 504 of FIG. 4 can be shifted by controlling the strength of electric field, of which field the subcoating layer corresponding to 504 is exposed to.

Another exemplary embodiment 600 of FIG. 18 is a variant of 500 in which randomly distributed spherical voids are also present in subcoating layers along with randomly distributed spherical particulates. Although the exemplary illustrations in FIG. 18 are based on multi-layered coating systems 100 and 200, the alternative exemplary embodiments 300 and 400 of FIG. 3 can also be used in place of 100 and 200.

The electrodes 5 and 6 of exemplary embodiments 500 and 600 of FIG. 18 can be formed of plane conductors which are transparent to wavelengths of interest. For instance, in the case of infrared reflectors, the upper electrode 5 has to be transparent to the infrared electromagnetic waves of interest. Moreover, if the multi-layered coating system illustrated in exemplary embodiments 500 and 600 are to be optically transparent, then both electrodes 5 and 6 must be optically transparent as well as transmitting infrared waves of interest.

In general, electrodes 5 or 6 or both may also be patterned with grid or grating structures, or with more complicated patterns such as array of holes or squares, etc. When electrodes are patterned with such structures, infrared wavelengths of interest and visible light can be transmitted through the openings in the patterned electrodes. In the case where electrodes are patterned with openings, conductive materials for the electrodes are not limited only to optically transparent conductors that transmit infrared wavelengths of interest, but any conductive materials can be used.

The foregoing is an illustrative of various example embodiments and is not to be interpreted as limiting thereof. Those skilled in the art will notice that many modifications are possible in the example embodiments without departing from the novel teachings and advantages. All such modifications are intended to be included within the scope of present disclosure as defined in the claims.

What is claimed:

1. A multi-layered coating system, comprising:
   a layer one including a plurality of particulates of average radius $a_1$ and of average particle refractive index $p_1$ that are randomly distributed to be separated from one another and a filler material of refractive index $n_1$ that is positioned in spaces between the plurality of particulates; and
   subsequent layers having i_max−1 layers, i_max being equal to or greater than 2, the subsequent layers comprising
      a layer i+1 positioned above the layer i, the layer i+1 including a plurality of particulates of average radius $a_{i+1}$ and of average particle refractive index $p_{i+1}$ that are randomly distributed to be separated from one another and a filler material of refractive index $n_{i+1}$ that is positioned in spaces between the plurality of particulates, i being the integers from 1 to i_max−1,
   wherein at least two layers among the i_max layers have different values in at least one selected from a group consisting of the average radius of the particulates, the average particle refractive index of the particulates, and the refractive index of the filler material so that wavelength bands of electromagnetic waves reflected by the at least two layers are different from each other.

2. The multi-layered coating system of claim 1, wherein the layer one or/and the layer i_max are positioned on a substrate, and the substrate comprises at least one selected from a group consisting of a conductive material, a dielectric material, a ceramic material, a semiconductor material, a polymeric material, and a textile.

3. The multi-layered coating system of claim 2, wherein the textile is a fiber having an elongated shape.

4. The multi-layered coating system of claim 1, wherein at least one layer has a thickness ranging from about 0.01 microns to about 10,000 microns.

5. The multi-layered coating system of claim 1, wherein the filler material of at least one layer comprises at least one selected from a group consisting of a polymeric material, a binder, a resin, a dielectric material, an oxide material, and a ceramic material.

6. The multi-layered coating system of claim 1, wherein the plurality of particulates of at least one layer comprise at least one selected from a group consisting of a conductive material, a dielectric material, and a semiconductor material.

7. The multi-layered coating system of claim 6, wherein the plurality of particulates of each layer have a core-shell structure, the core-shell structure comprising
   a shell comprising at least one first material selected from a group consisting of a conductive material, a dielectric material, and a semiconductor material, and
   a core comprising at least one second material different from the first material and selected from a group consisting of a conductive material, a dielectric material, and a semiconductor material.

8. The multi-layered coating system of claim 1, wherein the plurality of particulates of at least one layer have the average radius $a_i$ ranging from about 0.001 microns to about 250 microns.

9. The multi-layered coating system of claim 1, wherein when i is any value of 1 to i_max−1, the refractive index $n_i$ is the same as the refractive index $n_{i+1}$ or/and the average particle refractive index $p_i$ is the same as the average particle refractive index $p_{i+1}$.

10. The multi-layered coating system of claim 1, wherein when i is any value of 1 to i_max−1, the refractive index $n_{i+1}$ is greater than the refractive index $n_i$ or the average particle refractive index $p_{i+1}$ is greater than the average particle refractive index $p_i$.

11. The multi-layered coating system of claim 1, wherein when i is any value of 1 to i_max−1, the average radius $a_{i+1}$ of the plurality of particulates is greater than the average radius $a_i$ of the plurality of particulates or the average particle refractive index $p_{i+1}$ is greater than the average particle refractive index $p_i$.

12. The multi-layered coating system of claim 1, wherein when i is any value of 1 to i_max−1, the average radius $a_{i+1}$ of the plurality of particulates is the same as the average radius $a_i$ of the plurality of particulates, or/and the average particle refractive index $p_i$ is the same as the average particle refractive index $p_{i+1}$, and the refractive index $n_{i+1}$ is greater than the refractive index $n_i$.

13. The multi-layered coating system of claim 1, further comprising:
   a plurality of voids of average radius $b_1$ that are randomly distributed in the layer one to be separated from one another; and
   a plurality of voids of average radius $b_{i+1}$ that are randomly distributed in the layer i+1 to be separated from one another.

14. The multi-layered coating system of claim 13, wherein when i is any value of 1 to i_max−1, the average radius $b_{i+1}$ of the plurality of voids of the layer i+1 is greater than the average radius $b_i$ of the plurality of voids of the layer i.

15. The multi-layered coating system of claim 13, wherein when i is any value of 1 to i_max−1, the average radius $b_{i+1}$ of the plurality of voids of the layer i+1 is the same as the average radius $b_i$ of the plurality of voids of the layer i.

16. The multi-layered coating system of claim 13, wherein when i is any value of 1 to i_max−1, the average radius $b_{i+1}$ of the plurality of voids is the same as the average radius $b_i$ of the plurality of voids and the refractive index $n_{i+1}$ is greater than the refractive index $n_i$.

17. The multi-layered coating system of claim 13, wherein the plurality of voids of at least one layer comprise hollow dielectric shells having cavity radius ranging from about 0.002 microns to about 500 microns.

18. The multi-layered coating system of claim 13, wherein the average radius $b_i$ of the plurality of voids is greater than the average radius $a_i$ of the plurality of particulates.

19. The multi-layered coating system of claim 1, further comprising:
- a first electrode positioned adjacent to one of two surfaces of the layer i_max that is farther from the layer one; and
- a second electrode positioned adjacent to one of two surfaces of the layer one that is farther from the layer i_max,
- wherein a first voltage is applied to the first electrode, and
- a second voltage that is different from the first voltage is applied to the second electrode.

20. The multi-layered coating system of claim 19, wherein a pattern through which light is transmitted is formed on the first electrode or the second electrode.

\* \* \* \* \*